(12) United States Patent
Childe et al.

(10) Patent No.: US 12,413,398 B2
(45) Date of Patent: Sep. 9, 2025

(54) SYSTEM AND METHOD FOR TRUSTLESS KEY PROVISIONING

(71) Applicant: ARQIT LIMITED, London (GB)

(72) Inventors: Barry Childe, Sussex (GB); Jon Dapre, Hampshire (GB); David Webb, Sussex (GB); David Williams, Surrey (GB); James Brown, Oxfordshire (GB); Michael Mari, Sussex (GB)

(73) Assignee: Arqit Limited, London (GB)

( * ) Notice: Subject to any disclaimer, the term of this patent is extended or adjusted under 35 U.S.C. 154(b) by 58 days.

(21) Appl. No.: 18/273,447

(22) PCT Filed: Jan. 21, 2022

(86) PCT No.: PCT/GB2022/050164
§ 371 (c)(1),
(2) Date: Jul. 20, 2023

(87) PCT Pub. No.: WO2022/157501
PCT Pub. Date: Jul. 28, 2022

(65) Prior Publication Data
US 2024/0187219 A1  Jun. 6, 2024

(30) Foreign Application Priority Data
Jan. 22, 2021 (GB) ..................... 2100910

(51) Int. Cl.
*H04L 29/06* (2006.01)
*G06F 21/00* (2013.01)
(Continued)

(52) U.S. Cl.
CPC ............ *H04L 9/085* (2013.01); *H04L 9/0819* (2013.01); *H04L 9/0852* (2013.01); *H04L 9/0861* (2013.01); *H04L 9/16* (2013.01)

(58) Field of Classification Search
CPC ..... H04L 9/085; H04L 9/0819; H04L 9/0852; H04L 9/0861; H04L 9/16; H04L 9/0897; H04L 9/14; H04L 9/0816
See application file for complete search history.

(56) References Cited

U.S. PATENT DOCUMENTS 5,966,441 A * 10/1999 Calamera ............ H04L 63/0428
715/234
10,404,458 B1 * 9/2019 Yamada ................ H04L 9/0852
(Continued)

FOREIGN PATENT DOCUMENTS

| CN | 118474738 A | * | 8/2024 |
|---|---|---|---|
| WO | 2010013121 | | 2/2010 |
| WO | 2012044852 | | 4/2012 |

OTHER PUBLICATIONS

Chapter 12, Key Establishment Protocols Ed, A. J. Menezes, Van Oorschot P C, Vanstones S A, Handbook of Applied Cryptography, CRC Press, Boca Raton, FL, US pp. 489-541.

*Primary Examiner* — Lisa C Lewis
(74) *Attorney, Agent, or Firm* — Dentons US LLP

(57) ABSTRACT

A method of encryption key provisioning that includes providing, by a quantum computing safe method, a shared secret data to a device and to a security service; using the provided shared secret data to provide a root key; and using the root key for a sequence of stages, wherein each stage includes an operation which converts a start key into a different generated key, and the same stages are carried out in parallel at the device and at the security service; wherein the root key is used as the start key for a first stage, and a generated key produced by each stage, except for the final stage, is used as a start key for a next stage of the sequence; and wherein the generated keys produced by the last stage of the sequence at the device and at the security service are symmetric keys.

16 Claims, 19 Drawing Sheets

(51) Int. Cl.
*H04L 9/08* (2006.01)
*H04L 9/16* (2006.01)

(56) References Cited

U.S. PATENT DOCUMENTS

2013/0083926 A1    4/2013   Hughes
2021/0326410 A1*   10/2021   Daly ..................... H04L 63/061

* cited by examiner

SYSTEM AND METHOD FOR TRUSTLESS KEY PROVISIONING

This application is the National Stage filing under 35 U.S.C. 371 of International Application No. PCT/GB2022/050164, filed Jan. 21, 2022, claims the benefit of GB Application No. 2100910.5, filed Jan. 22, 2021, the contents of which are all hereby incorporated by reference herein in their entirety.

The present application relates to a method, system and software for trustless key provisioning in a key provisioning system, and in particular for trustless key provisioning of quantum safe keys.

BACKGROUND

Cryptography is used to protect billions of transactions every day from, without limitation, for example Transport Layer Security (TLS) security for online shopping and banking to ultra-secure government communications. These transactions rely on reliable and secure means for at least two or more transacting parties to share a secret key, enabling encryption of data by one party and subsequent decryption by other parties.

Due to the advent of quantum computers and the invention of Shor's algorithm, classical asymmetric cryptography is no longer seen as secure. Since most known secure communications protocols (e.g. TLS) rely on asymmetric cryptography to deliver an identical symmetric key to both ends of the communications channel (e.g. through Diffie-Hellman key exchange), it is expected that the advent of quantum computing will render these protocols insecure.

An alternative approach to secure encryption is to provide symmetric keys to both ends of a communication channel. If symmetric keys can be provided to both ends of a communication channel without using asymmetric cryptography this may provide a basis for the desired quantum computer resistant encryption. However, known techniques for secure symmetric key provisioning commonly require the key material to be manually distributed, which is time consuming and expensive, and relies on the trustworthiness of the personnel involved. Further, during a manual key provisioning process the distributing personnel have the full key material in their possession, so that if this key material is lost or compromised, either accidentally or by a distributing party being compromised, the key material needs to be revoked and new keys issued, repeating the same slow manual process.

Accordingly, there is a desire for a quantum computer resistant approach for carrying out symmetric key provisioning, and for an approach which avoids the risk of the key material being lost or compromised during the key provisioning process.

The embodiments described below are not limited to implementations which solve any or all of the problems of the known approaches described above.

SUMMARY

This Summary is provided to introduce a selection of concepts in a simplified form that are further described below in the Detailed Description. This Summary is not intended to identify key features or essential features of the claimed subject matter, nor is it intended to be used to determine the scope of the claimed subject matter; variants and alternative features which facilitate the working of the invention and/or serve to achieve a substantially similar technical effect should be considered as falling into the scope of the invention disclosed herein.

In a first aspect, the present disclosure provides a method of encryption key provisioning comprising: providing, by a quantum computing safe method, a shared secret data to a device and also to a security service; using the provided shared secret data to provide a root key; and using the root key as a basis for a sequence of stages, wherein each stage comprises an operation which converts a start key into a different generated key, and the same stages are carried out in parallel at the device and at the security service; wherein the root key is used as the start key for a first stage of the sequence, and a generated key produced by each stage of the sequence, except for the final stage of the sequence, is used as a start key for a next stage of the sequence; and wherein the generated keys produced by the last stage of the sequence at the device and at the security service are symmetric keys.

In a second aspect, the present disclosure provides a method of device authentication comprising: providing, by a quantum computing safe method, a shared secret data to a device and also to a security service; using the provided shared secret data to provide a root key; and using the root key as a basis for a sequence of stages, wherein each stage comprises an operation which converts a start key into a different generated key, and the same stages are carried out in parallel at the device and at the security service; wherein the root key is used as the start key for a first stage of the sequence, and a generated key produced by each stage of the sequence, except for the final stage of the sequence, is used as a start key for a next stage of the sequence; and further comprising using the generated keys produced by the last stage of the sequence at the device and at the security service to authenticate the device to the security service.

In a third aspect, the present disclosure provides a method of encryption key provisioning comprising: providing, by a quantum computing safe method, data derived from a secret data on a device to a security service; using the provided data derived from the secret data to provide a root key; using the root key as a basis for a sequence of stages, wherein each stage comprises an operation which converts a start key into a different generated key, and the same stages are carried out in parallel at the device and at the security service; wherein the root key is used as the start key for a first stage of the sequence, and a generated key produced by each stage of the sequence, except for the final stage of the sequence, is used as a start key for a next stage of the sequence; wherein the generated keys produced by the last stage of the sequence at the device and at the security service are symmetric keys.

In a fourth aspect, the present disclosure provides a method of device authentication comprising: providing, by a quantum computing safe method, data derived from a secret data on a device to a security service; using the provided data derived from the secret data to provide a root key; and using the root key as a basis for a sequence of stages, wherein each stage comprises an operation which converts a start key into a different generated key, and the same stages are carried out in parallel at the device and at the security service; wherein the root key is used as the start key for a first stage of the sequence, and a generated key produced by each stage of the sequence, except for the final stage of the sequence, is used as a start key for a next stage of the sequence; and further comprising using the generated keys produced by the last stage of the sequence at the device and at the security service to authenticate the device to the security service.

In a fifth aspect, the present disclosure provides an encryption key provisioning system comprising: means arranged to provide, by a quantum computing safe method, a shared secret data to a device and also to a security service; means arranged to use the provided shared secret data to provide a root key; and means arranged to use the root key as a basis for a sequence of stages, wherein each stage comprises an operation which converts a start key into a different generated key, and the system is arranged to carry out the same stages in parallel at the device and at the security service; wherein the root key is used as the start key for a first stage of the sequence, and a generated key produced by each stage of the sequence, except for the final stage of the sequence, is used as a start key for a next stage of the sequence; and wherein the generated keys produced by the last stage of the sequence at the device and at the security service are symmetric keys.

In a sixth aspect, the present disclosure provides a device authentication system comprising: means arranged to provide, by a quantum computing safe method, a shared secret data to a device and also to a security service; means arranged to use the provided shared secret data to provide a root key; and means arranged to use the root key as a basis for a sequence of stages, wherein each stage comprises an operation which converts a start key into a different generated key, and the same stages are carried out in parallel at the device and at the security service; wherein the root key is used as the start key for a first stage of the sequence, and a generated key produced by each stage of the sequence, except for the final stage of the sequence, is used as a start key for a next stage of the sequence; and further comprising means arranged to use the generated keys produced by the last stage of the sequence at the device and at the security service to authenticate the device to the security service.

In a seventh aspect, the present disclosure provides an encryption key provisioning system comprising: means arranged to provide, by a quantum computing safe method, data derived from a secret data on a device to a security service; means arranged to use the provided data derived from the secret data to provide a root key; and means arranged to use the root key as a basis for a sequence of stages, wherein each stage comprises an operation which converts a start key into a different generated key, and the same stages are carried out in parallel at the device and at the security service; wherein the root key is used as the start key for a first stage of the sequence, and a generated key produced by each stage of the sequence, except for the final stage of the sequence, is used as a start key for a next stage of the sequence; and wherein the generated keys produced by the last stage of the sequence at the device and at the security service are symmetric keys.

In an eighth aspect, the present disclosure provides a device authentication system comprising: means arranged to provide, by a quantum computing safe method, data derived from a secret data on a device to a security service; means arranged to use the provided data derived from the secret data to provide a root key; and means arranged to use the root key as a basis for a sequence of stages, wherein each stage comprises an operation which converts a start key into a different generated key, and the same stages are carried out in parallel at the device and at the security service; wherein the root key is used as the start key for a first stage of the sequence, and a generated key produced by each stage of the sequence, except for the final stage of the sequence, is used as a start key for a next stage of the sequence; and further comprising means arranged to use the generated keys produced by the last stage of the sequence at the device and at the security service to authenticate the device to the security service.

In a ninth aspect, the present disclosure provides a computer-readable medium comprising code or computer instructions stored thereon, which, when executed by a processor, causes the processor to perform the method according to any one of the first to fourth aspects.

In a tenth aspect, the present disclosure provides a computer program instructions which, when executed by a processor, causes the processor to perform the method according to any one of the first to fourth aspects The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

This application acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
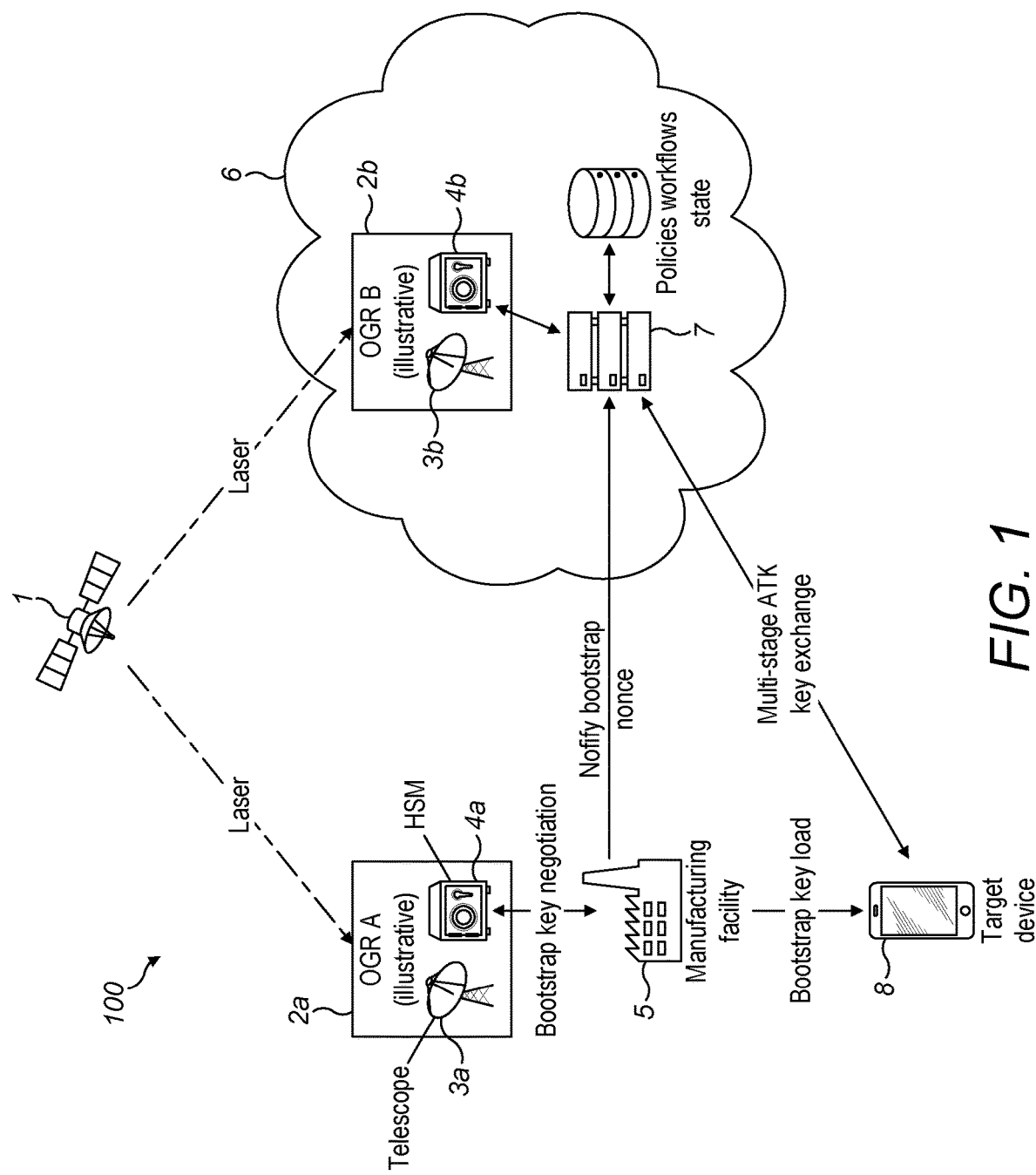
FIG. 1 is a schematic diagram illustrating a satellite quantum key provisioning system according to a first embodiment of the invention.

Common reference numerals are used throughout the figures to indicate similar features.

DETAILED DESCRIPTION

Embodiments of the present invention are described below by way of example only. These examples represent the best mode of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

In overview, the present disclosure provides a method of seeding an authentication key onto a party and into a cloud service for use in authenticating to a cloud service. In some examples the party is a device, and the cloud service is a security service, although this is not essential. The method provides quantum computer resistant security by placing a symmetric key with a party and a cloud service, which shared symmetric keys can be used as a root of trust for secure communications or other interactions between the party and the cloud service. The present disclosure provides a method by which the this symmetric key, which acts as a root of trust, is keyfilled onto a computing device through a process which can be made partially or wholly autonomous, in which the supporting cloud service, all human actors, and all eavesdroppers are unable to gain access to the symmetric key.

FIG. 1 is a schematic diagram illustrating an overview of an example of a satellite based quantum safe trustless key provisioning system 100 according to a first embodiment of the invention. The satellite trustless key provisioning system 100 comprises at least one quantum key provisioning (QKD) satellite 1 in earth orbit, and a plurality of optical ground receivers (OGR) 2. Each OGR 2 is capable of receiving quantum safe encryption keys from the QKD satellite 1 that are shared with at least one other OGR 2. Methods of delivering encryption keys from a satellite are known, and do not need to be discussed in detail herein.

As shown in FIG. 1, a first OGR 2a is associated with a manufacturing facility 5 and a second OGR 2b is associated with a cloud service 6. The OGRs 2a and 2b may be located in the manufacturing facility 5 and the cloud service 6 respectively, or may be located elsewhere and arranged for communication with the manufacturing facility 5 or the cloud service 6 respectively. The cloud service may have a unique ID. This ID may be specific to a datacenter or server hosting the cloud service, thereby identifying the datacenter or server that is hosting the cloud service. FIG. 1 shows the satellite 1 in communication with both OGRs 2a and 2b, it should be understood that this is not intended to indicate that it is essential for the satellite to be able to communicate with both OGRs 2a and 2b simultaneously.

Each OGR 2 comprises at least an optical communications system 3 arranged for optical communication with the at least one QKD satellite 1, and a hardware security module (HSM) 4 arranged to securely store and manage cryptographic key material delivered from the optical communications system 3. The HSM 4 ensures that any unauthorised attempts to extract keys are blocked or detected. The HSM may provide tamper-detection sensors, such as wire cages surrounding encapsulated memory modules, detection of over- or under-voltages and temperatures, etc. This list is not intended to be exhaustive. In some examples the HSM 4 maybe FIPS 140 certified. In operation of the system 100 symmetric QKD keys are delivered to both the manufacturing facility 5 and the cloud service 6 and stored securely in their respective HSMs 4a and 4b.

It will be understood by the skilled person that, in practice, the satellite based quantum key provisioning system 100 may also comprise numerous other elements, for example a satellite control and/or a security operations center, but these have been omitted for simplicity and clarity.

For simplicity and clarity only a single satellite 1 and two OGRs 2 are shown in FIG. 1. It will be understood that in practice the quantum key provisioning system 100 may comprise a constellation comprising any number of satellites 1, and any number of OGRs 2.

The cloud service 6 is a security service or system providing secure communications, for example by using fiber-optic links, and able to provide secure data storage. Further, the cloud service 6 is able to authenticate devices and users, as will be explained in detail below. In the present application the terms "secure" and "securely" are used only to refer to communications over links that are established without using an asymmetric algorithm. As discussed above, it is assumed that asymmetric algorithms will generally be unable to provide security against quantum computing. The cloud service 6 provides a registry for the generation, storage, delivery, and verification of quantum-safe keys, and for the authentication and verification of devices and users associated with the cloud service 6 using quantum-safe keys. All communications within and with the cloud service 6 are quantum-safe protected. The cloud service 6 may, for example, be the Arqit QuantumCloud™.

The cloud service 6 may be hosted in a public cloud or in a private datacenter. The cloud service 6 is backed, or supported, by a database 7, which provides data storage for the cloud service 6. The database 7 may, for example, be a traditional database, a NoSQL database, a distributed database or a database that backs a distributed ledger technology (DLT). The database 7 may, for example, operate using distributed ledger technology (DLT), distributed database technology (DDT) and hash-chain based logging/auditing, other database technology (not DLT) and hash-chain based logging/auditing, and/or message based technology and hash-chain based logging/auditing. This list is illustrative only and is not intended to be exhaustive, and other database technologies and architectures may be used.

A hash chain refers to the successive application of a cryptographic hash function to a piece of data. For non-repudiation a hash function can be applied successively to additional pieces of data in order to record the chronology of data's existence. The use of hash chains or logging and/or auditing is well known, and does not need to be described in detail herein.

The manufacturing facility 5 may be controlled by a customer wishing to distribute an encryption key onto a target device 8 controlled by the customer to enable access by the target device 8 to the cloud service 6. In some examples the manufacturing facility 5 may be controlled by the operator of the cloud service 6.

Figure 2:
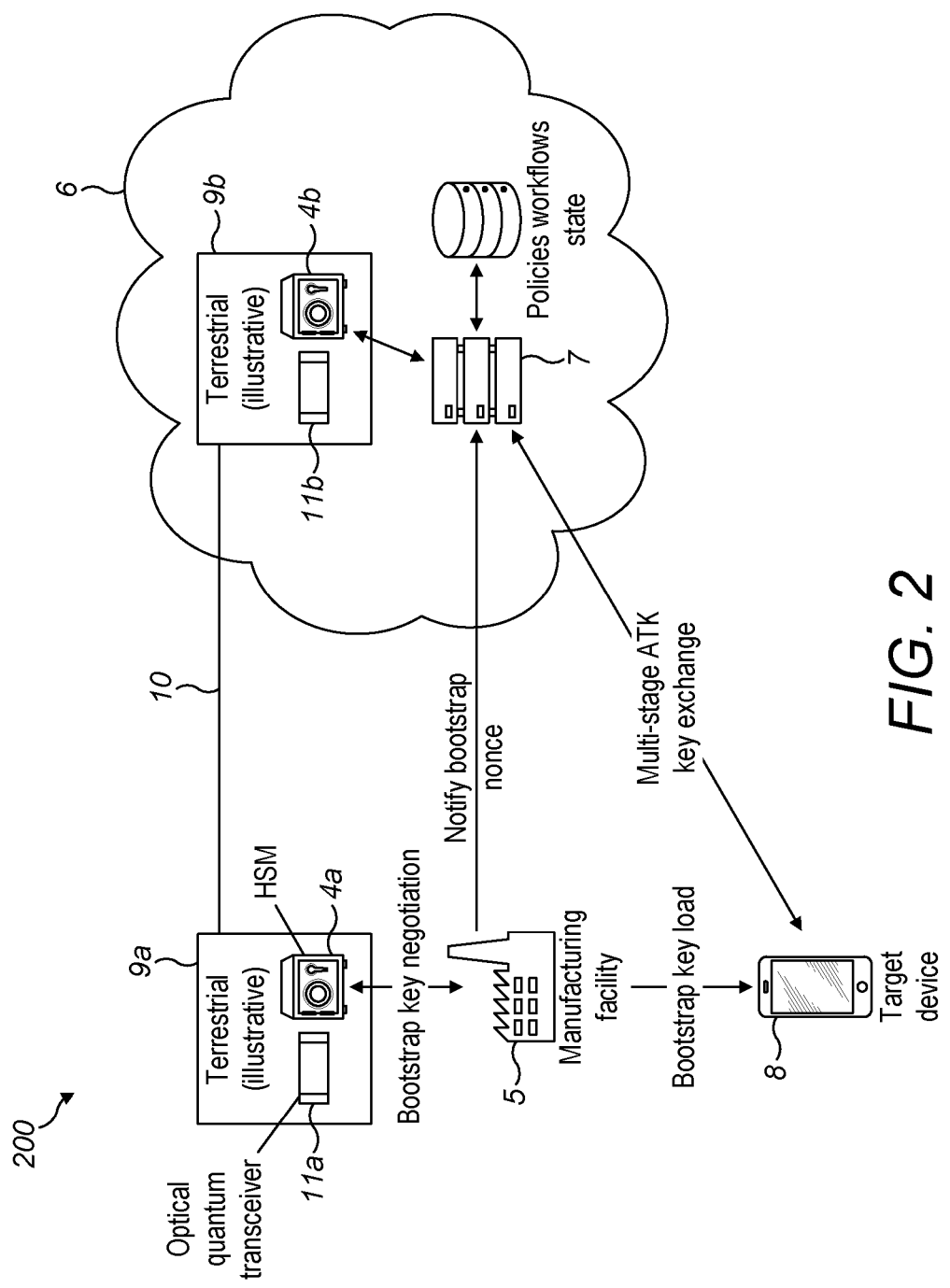
FIG. 2 is a schematic diagram illustrating a terrestrial quantum key provisioning system according to a second embodiment of the invention.

FIG. 2 is a schematic diagram illustrating an overview of an example of a terrestrial quantum safe trustless key provisioning system 200 according to a second embodiment of the invention. The terrestrial trustless key provisioning system 200 comprises a plurality of terrestrial transceivers 9 connected by optical fiber links 10. The terrestrial transceivers 9 are able to transmit and receive quantum encryption keys between them over the optical fiber links 10. Methods of sending and receiving encryption keys over optical fiber are known, and do not need to be discussed in detail herein.

The terrestrial quantum safe trustless key provisioning system 200 is similar to the satellite based quantum safe trustless key provisioning system 100 according to the first embodiment, with the exception that the terrestrial transceivers 9 take the place of the OGRs 2.

As shown in FIG. 2, a first terrestrial transceiver 9a is associated with a manufacturing facility 5 and a second terrestrial transceiver 9b is associated with a cloud service 6. The terrestrial transceivers 9a and 9b may be located in the manufacturing facility 5 and the cloud service 6 respectively, or may be located elsewhere and arranged for communication with the manufacturing facility 5 or the cloud service 6 respectively. Each terrestrial transceiver 9 comprises at least an optical quantum transceiver 11 arranged for communication of encryption keys over optical fiber links 10, and a hardware security module (HSM) 4 arranged to securely store and manage cryptographic key material delivered through the optical quantum transceiver 11. The cloud system 6 corresponds to the cloud system 6 of the first embodiment. In operation of the system 200 symmetric QKD keys are delivered to both the manufacturing facility 5 and the cloud service 6 and stored securely in their respective HSMs 4a and 4b.

It will be understood by the skilled person that, in practice, the terrestrial trustless key provisioning system 200 may also comprise numerous other elements, for example a security operations center, but these have been omitted for simplicity and clarity.

For simplicity and clarity only two terrestrial transceivers 9 are shown in FIG. 2. It will be understood that in practice the terrestrial trustless key provisioning system 200 may comprise a network comprising any number of terrestrial transceivers 9.

The trustless key provisioning systems 100 and 200 both operate to keyfill one or more target devices 8 by loading one or more encryption keys onto the target devices 8. For clarity and simplicity the loading of a single encryption key onto a single target device will be described herein. However, it should be understood that the systems 100 and 200 may be used to load any desired number of encryption keys onto any desired number of target devices 8

Figure 3:
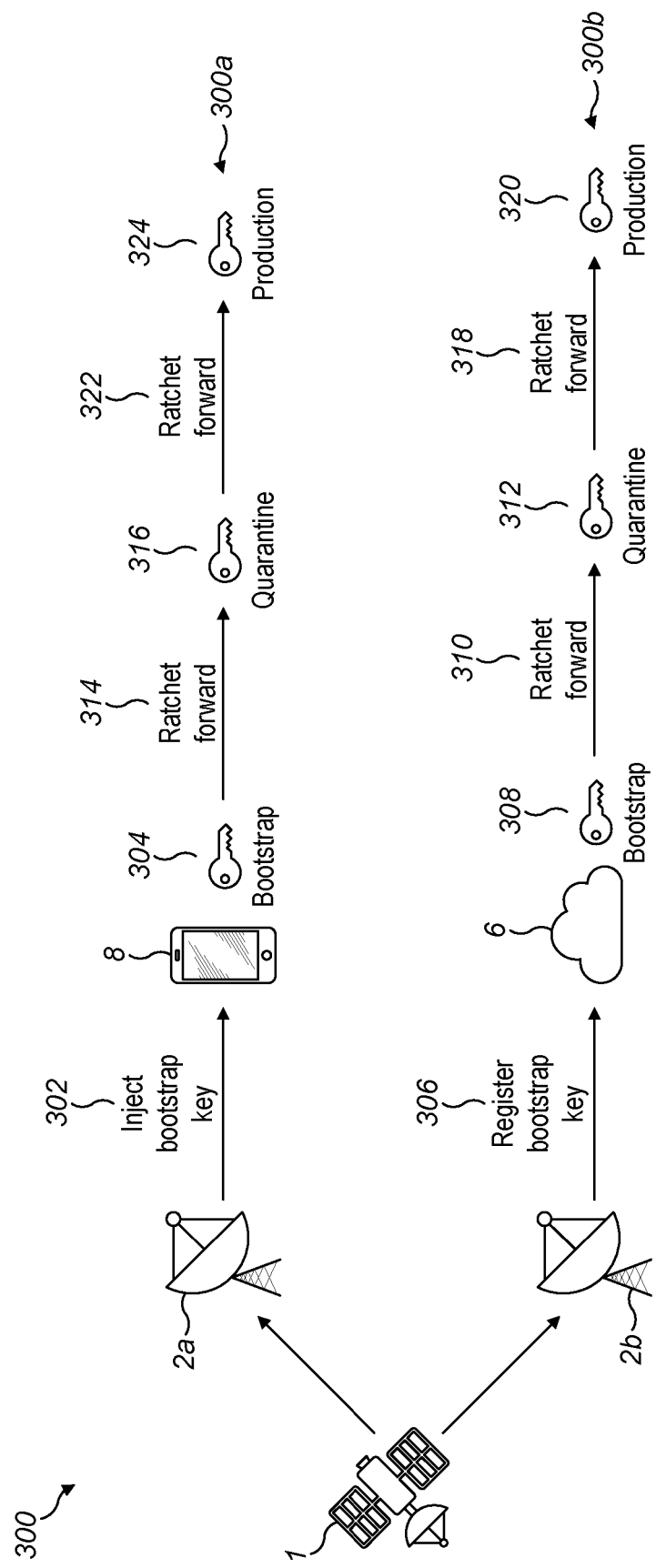
FIG. 3 is a schematic diagram illustrating a keyfill process according to the first or second embodiments of FIG. 1 or FIG. 2.

FIG. 3 shows an overview of the workflow of the overall key provisioning process 300 carried out by the quantum key provisioning (QKD) systems 100 and 200 according to the first and second embodiments. It will be understood that the quantum key provisioning systems 100 and 200 according to the first and second embodiments differ only in the mechanism by which quantum safe encryption keys are made available to the HSMs 4a and 4b associated with the manufacturing facility 5 and the cloud service 6.

The key provisioning process 300 delivers a QKD key to both the cloud service 6 and the target device 8. The key provisioning process 300 then ratchets these two keys (that is, the two copies of the same symmetric key) forward in identical steps, each comprising a ratchet operation, in both the cloud service 6 and target device 8 environments, to arrive at identical keys at the cloud service 6 and the target device 8. At each step a start key is converted by the ratchet operation into different new, or generated, key. These final identical keys can then be used as symmetric keys acting as a root of trust, which can be used to carry out quantum computing secure communication between the cloud service 6 and the target device 8, or for any other desired task. Accordingly, the key provisioning process 300 has two branches, or arms, which are carried out in parallel, comprising a first branch 300a, the upper branch in FIG. 3, carried out at the target device 8, and a second branch 300b, the lower branch in FIG. 3, carried out at the cloud service 6. In this example, a QKD key is delivered to both the cloud service 6 and the target device 8. Conveniently, this QKD key may be a symmetric encryption key. In other examples, in general the QKD key may be any form of shared secret data which can be used as a shared encryption key, or can be used as a basis for a shared encryption key.

In each branch 300a, 300b of the key provisioning process 300, the key can be used as an authentication key for the target device 8 to authenticate to the cloud service 6, and then generate the next key in the chain. The final key can continue to be used for authentication, for example to allow generation of session keys, or for any other purpose.

The workflow is defined by policy, so different workflows can be defined for different situations by assigning different policies to devices or groups of devices. A policy may be regarded as a group of related policy options which defines the runtime operation of the system 100 or 200 in particular cases. The manufacturing facility 5 has a defined policy which is assigned to the target device 8 in the cloud service 6. This defined policy may be a default policy which is used for all target devices 8 at the manufacturing facility 5, or may be a specific policy assigned to a class or type of target device 8, or even to a specific target device 8, for example, by the customer operating the manufacturing facility 5 or a customer organisation operating the device 8, as desired. The movement, or ratcheting, of the keys through the key provisioning process 300 may be subject to the approval of a number of control devices (not shown in FIGS. 1 to 3) which may be used to approve the keyfill to the target device 8 as defined by policy. In some examples a control device may be a device which has previously been keyfilled, enabling each control device to communicate securely with the cloud service 6. In other examples a control device may be any suitable device running a browser, or other application, enabling secure communication with the cloud service 6. The control devices are used by commissioning officers to approves the next ratchet of target device 8 as the target device 8 moves through the workflow. The number, and identity, of the control devices and commissioning officers, and possibly their identities, required to approve ratcheting forward and keyfill to a target device 8 is defined by the policy set by the manufacturing facility 5, or the customer, for the target device 8. Typically, the commissioning officers are designated and selected by the customer operating the manufacturing facility 5, although this is not essential. The commissioning officers may, for example, be crypto custodians, key handlers, site security officers, etc., and may generally correspond to the personnel responsible for carrying out known key provisioning processes. The commissioning officers may be formally trained and vetted. The procedures used to select the commissioning officers may be determined based on the requirements of the customer in any specific implementation, and do not need to be discussed in detail herein.

In some examples the control devices may have been keyfilled with secure keys by the key provisioning process 300 to enable secure communication with the cloud service 6, so that the control devices may have been target devices 8.

In FIG. 3 the initial provision of a common QKD key to the cloud service 6 and the target device 8 is shown as being carried out using a satellite 1 and OGRs 2a and 2b, according to the system 100 of the first embodiment. If the system 200 according to the second embodiment were used instead, the illustrated satellite 1 and OGRs 2a and 2b would be replaced by the optical fiber links 10 and terrestrial transceivers 9a and 9b.

The key provisioning process 300 according to the first and second embodiments has a number of goals, as follows. To use policy to define a sequence of workflow steps which define a key chain used for authentication of target devices 8 to the cloud service 6 for future key negotiation tasks (e.g. to negotiate session keys with another device), or could be used for any other purpose. To associate a target device 8 with a workflow step policy, where each workflow step defines whether the step requires user authentication and/or commissioning officer approval; to provision a bootstrap key onto the target device 8 at manufacture, whereby the bootstrap key is calculated in the manufacturing facility 5 and in the cloud service separately, in both places derived from the same QKD delivered key to the two locations, this ensures that the key cannot be intercepted in transit over classical communication channels between the manufacturing facility 5 and the cloud service 6. To enable the target device 8 to connect to the cloud service 6 using the bootstrap key, and transition to a new authentication key using a ratchet mechanism according to the policy defined. Subsequently, to enable the target device 8 to connect to the cloud service 6 using the latest ratchet key, and transition to a new authentication key using a ratchet mechanism according to the policy defined.

An overview of the key provisioning process 300 of FIG. 3 according to the first and second embodiments is as follows.

All operations of the key provisioning process 300 and/or carried out by the systems 100 or 200 will be securely logged and/or audited using a verifiable quantum secure hash-chain. This is required to ensure that the log/audit trail is immutable and cannot be modified without detection by, for example, an attacker. In examples where the system 100 or 200 is based on DLT, then DLT can provide the tamper-proof logging/auditing capability. Alternatively, in examples where the system 100 or 200 is not based on DLT, then a hash-chain based logging/auditing system can be used to ensure logging/auditing is tamper proof.

For clarity, and to avoid unnecessary repetition, logging is not explicitly mentioned in the detailed explanation of the operation of the embodiments of the invention set out below. However, it should be understood that each step of the method 300 will be logged. This may, for example, be carried out by a centralised logging service provided by the cloud service 6.

For clarity, and to avoid unnecessary repetition, auditing is not explicitly mentioned in the detailed explanation of the operation of the embodiments of the invention set out below. However, it should be understood that each workflow start, error and success of the method 300 will be audited. This may, for example, be carried out by a centralised auditing service provided by the cloud service 6.

In advance of carrying out the key provisioning process 300, users of the systems 100 or 200 are signed up, or registered, with the cloud service 6. The cloud service 6 provides a user sign up service using user email addresses, which are validated before allowing the users to be signed up. In the illustrated embodiments two-factor authentication is used when signing up new users. The validation of email addresses and two factor authentication are well known procedures, so that there is no need to describe these in detail here. The use of validation of email addresses and two factor authentication when signing up new users is not essential, and other examples different sign up procedures may be used.

When users are signed up with the cloud service 6, the cloud service 6 assigns each user a random symmetric user key, which is stored in the database 7 of the cloud service 6 encrypted with a hash of the respective users password. It should be understood that this is not essential, and that other means of storing and protecting the user keys and associated passwords may be used.

Conveniently, the first user signed up from any given organisation is assigned the administrator role. Further users from the same organisation are then assigned their role by the administrator of the organisation. However, this is not essential, and other methods of assigning roles may be used in alternative examples.

Users who have been signed up with the cloud service 6 may be assigned a number of different roles by the administrator or administrators of their respective organisation. Accordingly, the cloud service 6 provides a process whereby an administrator can modify the role of other users in the cloud service 6. The details of this process, and what modifications can be made by a specific administrator, may be determined as necessary based on the requirements of each organisation.

A user may be assigned the role of administrator. Administrators manage the cloud service 6, define the policies used during the key provisioning process 300, assign roles to other users, and carry out other tasks. A user may be assigned an audit role. Further, as a part of the auditing discussed above, administrators or specific audit roles may be sent audit notifications regarding parts of the system and process for which they are responsible. Administrators or audit roles will be able to configure their audit notifications appropriately, for example, to receive emails when specific audits or classes of audits are received. The audit roles may also provide access and lockdown of all audit related data within the system as an assurance activity that is distinct from the role of an administrator. This may be desirable to prevent internal administrator level system roles subverting, deleting or attempting to disguise any unauthorised system level activities.

A user may be assigned the role of commissioning officer. Commissioning officers may be required to approve the ratchet of a key to the next key in the chain on a target device as a part of the automated keyfill process using control devices depending on the workflow step policy, as will be discussed in detail below.

A user may be assigned the role of user. Users are the authorised users of a specific target device, and may be asked to provide their credentials in order to permit the target device to ratchet to the next key depending on workflow step policy, as will be discussed in detail below.

In addition to the roles identified above, other roles or scopes may be applied to each user, for example whether to allow the user to create and use an OTP via an API.

In addition to the functionality provided to users signed up to the cloud system 6 discussed above, the cloud system 6 may further provide a process whereby a user can authenticate to the cloud service from a device that has not been provisioned with a cloud service key to perform some administrative operations via a web-portal or app.

Referring to FIG. 3, the system 100 or 200 provides an acyclic state-machine in which a responsible administrator can specify a series of workflow steps which define a key ratchet pipeline forming the branches 300*a*, 300*b* of the key provisioning process 300. An acyclic state machine is a finite state machine where it is not possible to revisit a previously-visited state, that is, it forms a straight line from start state to end state with no cycles.

Before the key provisioning process 300 of FIG. 3 can be carried out for a target device 8, the responsible administrator(s) must define a workflow step policy defining one or more workflow steps, and therefore defining a chain of steps in the workflow of the key distribution process 300, and this defined workflow step policy is stored in the database 7 in the cloud service 6. Further, the individual workflow steps must also be defined, and these defined workflow steps are also stored in the database 7 in the cloud service 6.

Each defined workflow policy defines the requirements which must be met for a target device 8 to transition from each workflow state in the workflow of the key provisioning process 300 to the next workflow state. Each workflow step defines the requirements which must be met for a target device 8 to transition from a specific workflow state to the next workflow state. A workflow step may define whether user authentication on the target device is required to transition to the next workflow state, whether commissioning officer approval(s), for example on separate control device(s) or via a web-portal are required, and how many, to transition to the next workflow state, and API scopes permitted when authenticating to the cloud service with the ratchet key at that workflow step.

For simplicity and clarity the present description relates to the keyfilling of a single target device 8 according to a single workflow policy. It will be understood that different organisations using the system 100 or 200 may set different workflow policies, and that each organisation may have multiple different workflow policies for different target devices 8 or groups of target devices 8.

As shown in FIG. 3, for each target device 8, the key provisioning process 300 begins by injecting 302 a bootstrap key into the target device 8 to place the target device 8 into a bootstrap state 304. The manufacturing facility 5 selects a QKD key stored in the HSM 4*a* of their OGR 3*a* or terrestrial transceiver 9*a*, as appropriate, derives a new bootstrap key from that selected key, and injects the derived bootstrap key into the target device 8. The bootstrap key is then stored in the target device 8 in some manner, for example by storing the bootstrap key on the device storage, or inside a chip, or in some other manner. This bootstrap key injection may be carried out on initial manufacture of the target device 8, or at any time thereafter. As is discussed above, the QKD key may be any form of shared secret data which can be used as a shared encryption key, or can be used as a basis for a shared encryption key. Conveniently, the QKD key may be a symmetric encryption key.

The manufacturing facility 5 then, or simultaneously, registers 306 the bootstrap key with the cloud service 6 using a bootstrap provisioning terminal or service which provides secure communication with the cloud service 6. To carry out the provisioning 306, the manufacturing facility 5 notifies the cloud service 6 of metadata related to the target device 8, for example the device ID and/or manufacturer, and the data used to derive the bootstrap key from the QKD key, including the ID of the QKD key. However, the manufacturing facility 5 does not send the bootstrap key or the QKD key to the cloud service 6. Accordingly, these keys cannot be intercepted or accessed by other parties.

The cloud service 6 stores the QKD identity, metadata and data provided by the manufacturing facility 5 in the database 7. The QKD key selected by the manufacturing facility 5 from its HSM 4*a* to derive the bootstrap key is a symmetric key which is also available to the cloud service 6 from its HSM 4*b*. Accordingly, the cloud service 6 is able to calculate the same bootstrap key on-demand when needed using the stored provided QKD ID and data, and the stored QKD key.

As a part of the provisioning 306, the cloud service 6 generates a device record for the target device 8 in the database 7, which device record stores or links to a copy of the workflow policy selected for the target device 8 by the relevant administrator(s) and/or the manufacturing facility 5. Further, the cloud service 6 initialises a commissioning signatures field and a commissioning parties field for the target device 8 to zero, and generates and stores a random commissioning salt, for use in each workflow step for that target device 8 that requires commissioning officer approval. The commissioning signatures field is a field in the device record for the target device 8 which collates a list of signed random numbers which provide proof that a commissioning officer has signed.

The cloud service 6 initialises the device record in the database 7 for the target device 8 with a workflow state bootstrap 308.

Accordingly, the workflow state of the target device 8 will start at the known state bootstrap 304 and the workflow state of the device record for the target device 8 in the cloud service 6 will be the corresponding known state bootstrap 308. The target device 8 can transition to the next workflow state if the requirements of the next workflow state are met, as defined in the workflow step policy assigned to the target device 8, as discussed in more detail below.

Accordingly, the bootstrap key is a key, formed from a QKD delivered key, which is injected in a device at manufacture, or later, and can also be calculated in a cloud service. The bootstrap key grants access to a limited set of cloud service APIs, specifically those related to advancement through the ratchet pipeline.

The system 100 or 200 provides a method for the target device 8 to authenticate to the cloud service 6 using either the bootstrap key or a key ratcheted from the bootstrap key. In each case, the cloud service 6 builds the keychain required for authentication from the initial QKD key, stored in the HSM 4*b*, to generate the bootstrap key. Subsequent keys based on the bootstrap key can be calculated by the cloud service 6 on demand by using the stored ratchet values held in the database 7. When the target device 8 has been authenticated to the cloud service 6 using either the bootstrap key or a key subsequently ratcheted from it, the cloud service 6 returns a token, such as a JSON Web Token (JWT), whose scope is defined by the workflow step, to the target device 8. The authentication of the target device 8 by the cloud service 6 uses a challenge response to generate a session key from the current key (the bootstrap key or a key subsequently ratcheted from the bootstrap key) and a set of two challenge codes which are exchanged between the target device 8 and the cloud service 6, and then discarded.

A JWT is an Internet standard method for creating data with optional signature and/or optional encryption whose payload holds JSON that asserts at least some number of claims or scopes.

The cloud service 6 uses a key to encrypt client state, K_CS of the target device 8. This is to allow RESTful APIs whereby the cloud service 6 server must not store client state of the target device 8 between sessions, rather client state is returned to the client and sent again in the next RESTful call. This is used, for example, to return a session key to the target device 8 client for one service so that it can supply it in the next call to a different service, due, for example, to load-balancing, and avoids the cloud service 6 having to store the session key between calls, or distribute the session key amongst many services.

When a workflow step requires commissioning officer approval in order for the target device 8 to transition, all of the required commissioning officers need to authorise a request to approve using a control device, typically via a secure mobile application or web app running on the control device. In some examples the commissioning officers may alternatively authorise a request to approve using an email link, or scanning a QRCode to activate the link, or approving via a mobile application or web app running on any untrusted device. When a commissioning officer authorise a request to approve, the approval results in the commissioning officer's control device using the commissioning officer's user key to encrypt the commissioning salt previously generated and stored by the cloud service 6 and the result added to a list of signatures in the commissioning signatures field of the device record for the target device stored in the database 7, and the username of the commissioning officer being added to the commissioning parties field of the device record for the target device stored in the database 7.

Following authentication of the target device 8 to the cloud service 6 using either the bootstrap key or a key ratcheted from the bootstrap key, as appropriate, and the target device 8 negotiating a session key with the cloud service 6, an then receiving an authentication token, such as a JWT from the cloud service 6, the user of the target device 8 can initiate a provisioning process for the target device 8 with the cloud service 6 in order to trigger a ratchet of the current key, which may be the bootstrap key or a key ratcheted from the bootstrap key.

In order to register the target device 8 with the cloud service 6, the target device 8 calls a provisioning function, passing the authentication token and (optionally) the user credentials if required by the workflow step. Optionally, the cloud service 6 may authenticate the user using a password, and optionally using two factor authentication (2FA). In some examples other means of authentication may additionally or alternatively be used, such as an authenticator, such as a user JWT, from an identity service. In response to receipt of the token, and if any optional user authentication is successful, the cloud service 6 generates some random data and uses this to create a ratchet value that is be used to ratchet the current latest ratchet key into the next ratchet key, storing this value in the database 7 in an array of ratchet values associated with the target device 8. Optionally, if the current workflow step for the target device 8 requires commissioning officer approval and the required approvals are stored in the commissioning signatures field associated with the workflow step, then the list of commissioning signatures are combined into the ratchet value for the workflow step. This ratchet value will be used as the latest in a chain of ratchet values which can be used to calculate a new authentication key from the original QKD key on-demand in future.

The cloud service 6 then returns the ratchet value to the target device 8, enabling the target device 8 to also create the new ratchet key from the latest key in its chain to form a new authentication key. Accordingly, the new ratchet key will be created from the bootstrap key at first enrolment, or from the key created by the previous enrolment in later enrolments.

As shown in FIG. 3, when the target device 8 is in the bootstrap state 304, the key provisioning process 300 continues by the target device 8 authenticating and provisioning with the cloud service 6 using the authentication and provisioning processes described above. In some examples, the authentication and provisioning of the target device 8 with the cloud service 6 may be triggered by a user action. In other examples, the authentication and provisioning of the target device 8 with the cloud service 6 may be triggered automatically by the target device 8 itself, for example on first boot of the target device 8, if no user authentication is required by the policy. If the target device 8 authentication and provisioning processes are successful, any optional user authentication is successful, and any commissioning officer approvals identified as required by the next workflow step of the workflow step policy which applies to the target device 8 are received, the cloud service 6 generates a ratchet value as described above, and uses the ratchet value to create a ratchet authentication key from the bootstrap key, which is in turn created from the selected QKD key as described above. The cloud service 6 then ratchets 310 forward the status of the target device 8 in the device record in the database 7 from the bootstrap state 308 to the next workflow state, in the example of FIG. 3 the state 312 named in this example "quarantine".

The cloud service 6, then, or simultaneously, sends the ratchet value to the target device 8, and the target device 8 creates the same ratchet authentication key from the bootstrap key, which was in turn previously created from the selected QKD key as described above, and the target device 8 ratchets 314 its status forward from the bootstrap state 304 to the next workflow state, in the example of FIG. 3 the state 316 named "quarantine".

In the example of FIG. 3, the target device 8 in the state 316 named "quarantine" and having the status of the target device 8 in the device record in the database 7 in the corresponding state 310 named "quarantine", is provided with restricted systems and network connectivity by the cloud service 6, subject to the target device 8 being successfully authenticated and registered with the cloud service 6. This restricted connectivity is selected to ensure that a target device 8 in the state 316 cannot be used to harm, or breach the security of, the cloud service 6. In some examples the restricted connectivity provided to a target device 8 in the state 316 may be to allow connectivity only to a closed quarantine network.

Then, when the target device 8 is in the state 316, the key provisioning process 300 continues by the target device 8 again authenticating and provisioning with the cloud service 6 using the authentication and registration processes described above. If the authentication and provisioning processes are successful, any optional user authentication is successful, and any commissioning officer approvals identified as required by the next workflow step of the workflow step policy which applies to the target device 8 are received, the cloud service 6 generates a further ratchet value as described above, and uses the further ratchet value to create a new ratchet authentication key from the ratchet key, which is in turn created from the bootstrap key and the selected QKD key as described above. The cloud service 6 then ratchets 318 forward the status of the target device 8 in the device record in the database 7 from the state 312 to the next workflow state, in the example of FIG. 3 the state 320 named "production".

The cloud service 6, then, or simultaneously, sends the further ratchet value to the target device 8, and the target device 8 creates the same new ratchet authentication key from the ratchet key, which was in turn previously created from the bootstrap key and the selected QKD key as described above, and the target device 8 ratchets 322 its status forward from the state 316 to the next workflow state, in the example of FIG. 3 the state 324 named "production".

In the example of FIG. 3, the target device 8 in the state 324 and having the status of the target device 8 in the device record in the database 7 in the corresponding state 320, is provided with full systems and network connectivity by the cloud service 6, subject to the target device 8 being successfully authenticated and provisioned with the cloud service 6. The connectivity provided may be set by connectivity policies of the organisation controlling the target device 8. The final "production" key will permit access to a wider range of cloud service functions than the "quarantine" state, with the access provided being defined by the scopes in the relevant workflow policy.

The example of FIG. 3 shows a key provisioning process 300 in which a target device 8 is ratcheted from an initial bootstrap state 304 to an intermediate "quarantine" state 316 to a final "production" state 324 providing full systems and network connectivity. In other examples there may be any number of intermediate states between an initial bootstrap state and a final state, as required by the policies of any particular organisation, each of states being defined and named in the workflow step policy. The requirements to allow a target device 8 to ratchet forwards from one state to the next may be set as desired, and in particular whether user authentication is required, and whether commissioning officer approvals are required, and their number, may be set as required. It is not essential to provide an intermediate "quarantine" state providing restricted connectivity. In addition to the initial bootstrap state, and a final state, some examples may comprise intermediate states named one or more of: "InitialConfiguredFactory", "MNOPending", "MNOProvisioned", "CustomerPending", "CustomerProvisioned", and/or "Quarantine".

In some circumstances it may be necessary to revoke all keys associated with a target device 8 and to return the target device 8 back to the original manufacturing facility state with the bootstrap key. This may be done by zeroing all commissioning parties and commissioning signatures fields, zeroing all ratchet fields and ratchet arrays, and setting the current workflow step back to the start. This will reset the record for the target device 8 in the database 7 back to the bootstrap states 308. The next authentication, for example with the key ratchet associated with state 324, will therefore fail and an error code will be returned to the target device 8 notifying that a factory reset has occurred, causing the target device 8 to reset to the bootstrap state 304, Optionally, the bootstrap key can also be deleted. The target device 8 can then restart the enrolment process again, at the appropriate point.

In an alternative example, instead of the bootstrap key being derived from a QKD delivered key in both manufacturer and cloud service locations, the bootstrap key may be delivered to the cloud service 6 by a classically secured, post-quantum cryptographically secured, or physical mechanism.

It will be understood from the above, and from the following more detailed examples, that the disclosed embodiments can achieve the goals set out above.

Figure 4:
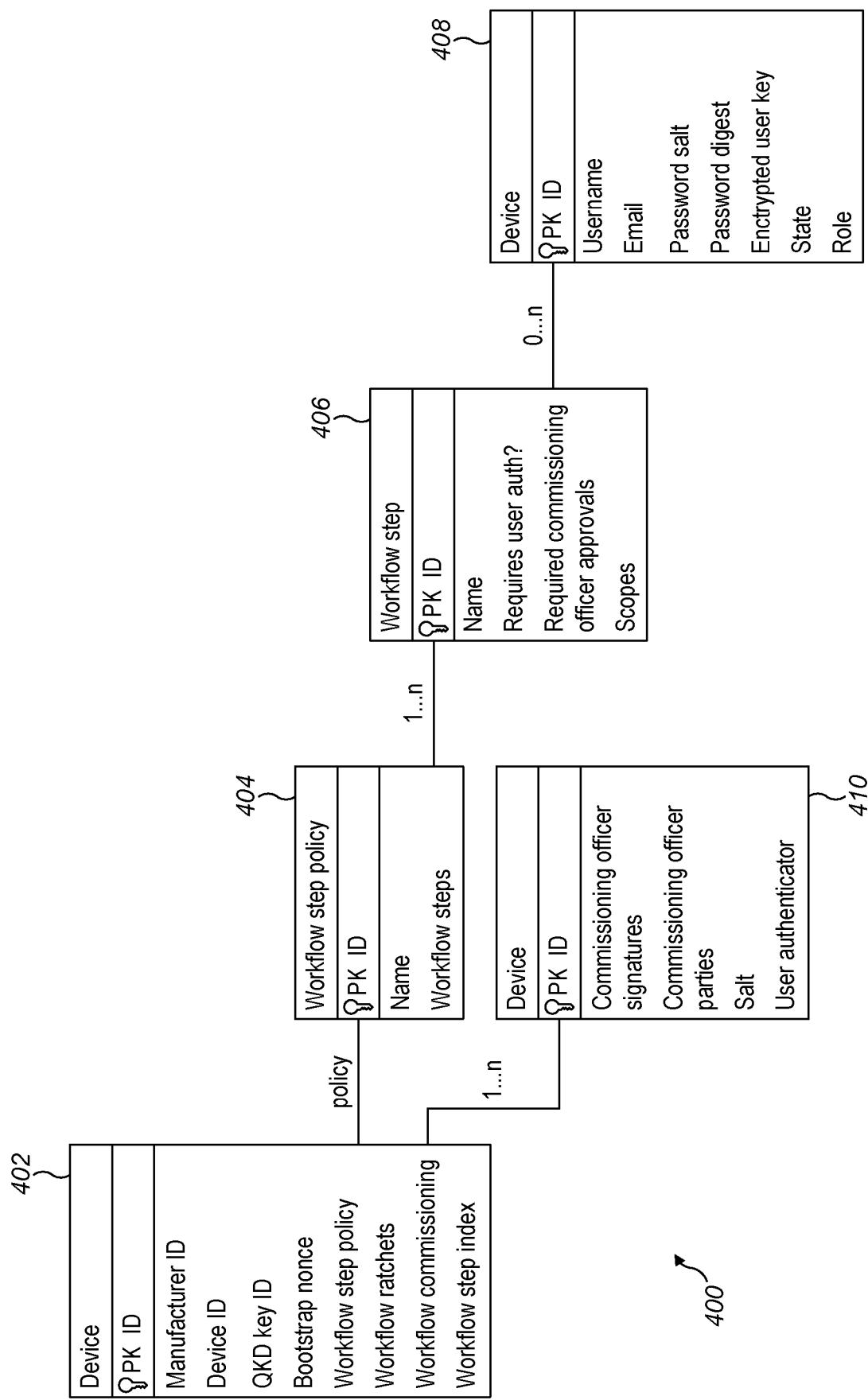
FIG. 4 is schematic diagram illustrating a schema of a device record useable in the keyfill process of FIG. 3.

FIG. 4 is an illustrative example of a schema 400 which may be maintained in the database 7 of the cloud service 6 as the device record for a target device 8. The schema 400 comprises device data 402 regarding the target device 8. The device data 402 comprises a manufacturer ID, a device ID, a QKD key ID, a bootstrap nonce, a workflow step policy identifier, workflow ratchet values, a workflow commissioning identifier, and a workflow step index. The manufacturer ID may identify the manufacturing facility 5, or alternatively may identify the organisation responsible for the target device 8. The bootstrap nonce is the data used to derive the bootstrap key from the QKD key.

The workflow step policy identifier of the device data 402 links to workflow step policy data 404 for the workflow step policy which applies to the target device 8. The workflow step policy data 404 comprises a workflow step policy ID, a name, and a number of workflow step identifiers.

Each workflow step identifier of the workflow step policy data 404 links to workflow step data 406. Each workflow step data 406 comprises a workflow step ID, a name which identifies the name of the state reached by executing the workflow step, identifies whether the workflow step requires user authentication, whether the workflow step requires commissioning officer authorisation, and the scope, or operating permissions, granted to the key reached by executing that workflow step.

If a workflow step does require commissioning officer authorisation, the workflow step data 406 is linked to a number of commissioning officer authorisation data 408. Each commissioning officer authorisation data 408 comprises an authorisation ID, the username of the commissioning officer, their email address, their password salt, their password digest, their encrypted user key, their state, and their user role. In the illustrated example, the workflow step data 406 is linked directly to a single commissioning officer authorisation data 408, for simplicity and clarity. It will be understood that each workflow step data 406 may be linked to any number of commissioning officer authorisation data 408. Further, rules may be set defining which commissioning officer(s) or combination(s) of commissioning officers are required by a workflow step, These rules may be arbitrarily complex, as required in any specific implementation. For example, approval may be required by a specific individual, one or more members of a defined group, or by logically defined combinations, for example, approval by commissioning officer A AND a member of commisioning officer group B, or approval by commissioning officer C OR two members of commissioning officer group D AND a member of commissioning officer group E.

The workflow step policy identifier of the device data 402 also links to workflow step approval data 410 for the target device 8 where approval state is stored. The workflow step approval data 410 comprises a workflow step approval ID, a record of the commissioning officer signatures of approving commissioning officers, the names of approving commissioning officers, the commissioning salt to be encrypted or signed by the commissioning officers, and a record of the user who provided authentication for this workflow step, if required.

In the example of FIG. 4 there may be one or more workflow step data 406 linked into a schema 400, as indicated by the indicator 1:n on the line linking the workflow step data 406 to the workflow step policy data 404, and there may be zero, or any number of commissioning officer authorisation data 408 linked to each workflow step data 406, as indicated by the indicator 0.n on the line linking the commissioning officer authorisation data 408 to the workflow step data 406. Further, there will be one or more workflow step approval 410 linked into a schema 400, as indicated by the indicator 1:n on the line linking the workflow step approval 410 to the device data 402. There will be a workflow step data 406 corresponding to each workflow step of the workflow step policy. Further, each workflow step may require no commissioning officer authorisation, or any desired number of commissioning officer authorisations, so that the workflow step data 406 will be linked to a corresponding number (including zero) of commissioning officer authorisation data 408.

Figure 5:
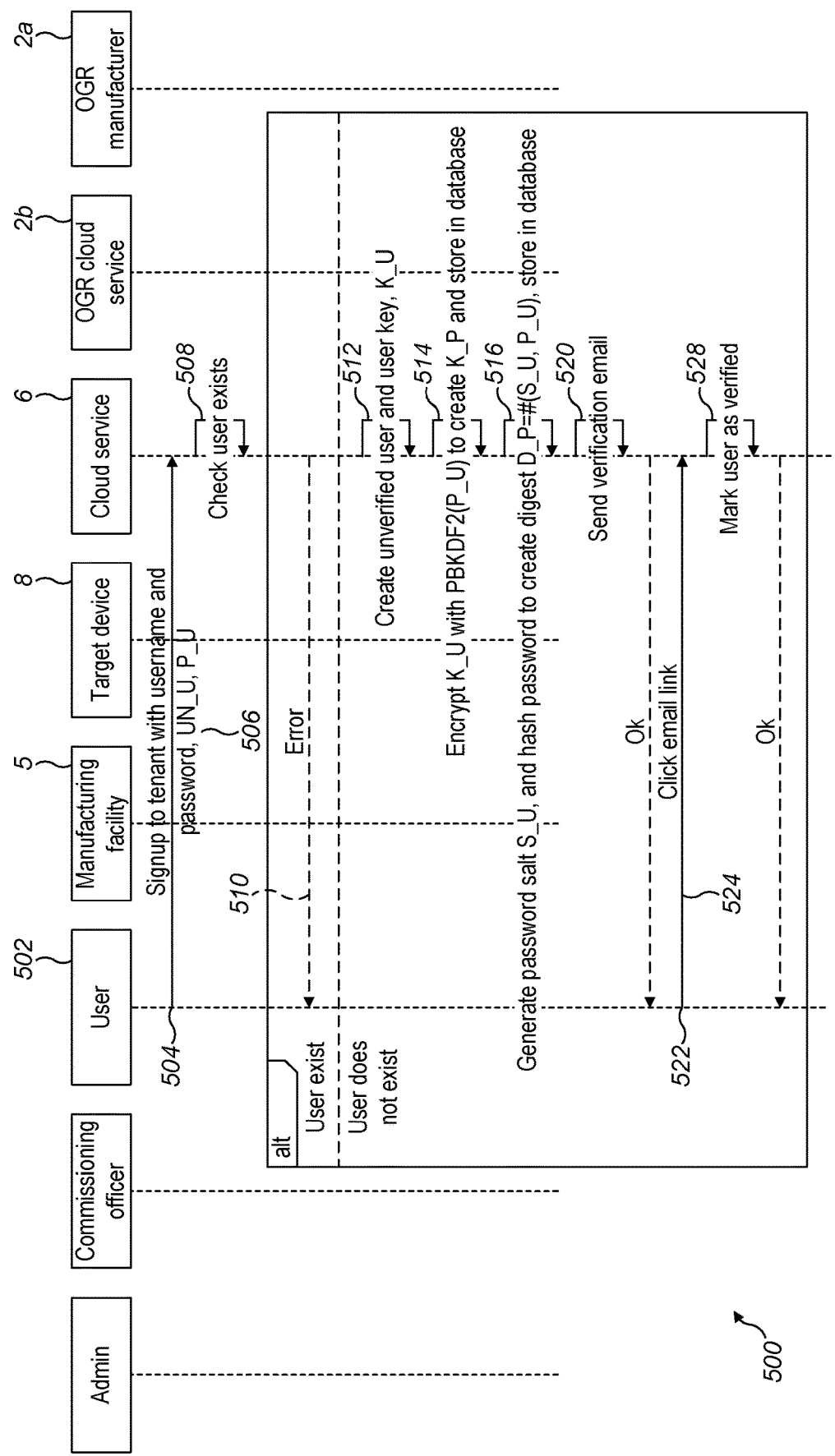
FIG. 5 is a schematic diagram illustrating a user enrolment process useable in the first and second embodiments of FIGS. 1 and 2.

FIG. 5 is an illustrative example of a detailed user enrolment process which may be used in the illustrated first and second embodiments.

In the user enrolment process 500 shown in FIG. 5, the process 500 begins when a user 502 chooses to create an account on the cloud service 6. The user provides 504 sign up information comprising a username, UN_U, an email address E and a password, P_U. The user 502 may provide the sign up information in a mobile device app, or in a webapp, or in some other fashion.

The user app then calls 506 the cloud service 6, passing UN_U and P_U, and requesting a new account.

The cloud service 6 checks 508 whether an account for the user 502 already exists. If the check 508 indicates that the account does already exist, the cloud service 6 returns 510 an error message and enrolment is terminated. Alternatively, if the check 508 indicates that the account does not already exist, the cloud service 6 creates 512 a new record in the database for the user 502, and creates a symmetric User Key, K_U.

Then, the cloud service 6 derives 514 a password key, K_P, from P_U using PDKDF2 (or other password hashing algorithm using sha256 or greater), and encrypts K_U with K_P to form K_UE, storing the result in the user record, wherein:

$K\_P=PBKDF2(P\_U)$ or $K\_P=PBKDF2(P\_U,<num\ iterations>)$ and $K\_UE=\{K\_U\}K\_P$ Then, the cloud service 6 generates 516 a random password salt, S_U, and uses it to hash P_U to create a digest D_P of the password, storing S_U and D_P, wherein:

$D\_P=\#(S\_U,P\_U)$

Then, the cloud service creates 518 a record in the database for the user with at least the following fields and values (other fields e.g. Tenant ID, Company Name etc. could be added as required):
Username: UN_U
Email: E
Password Salt: S_P or S_U
Password Digest: D_P
User Key: K_UE
State: Unverified
Role: User (if this is the 1$^{st}$ user of the tenant, Admin)

The cloud service 6 then sends 520 a verification email to the user's email address, E, which email contains an anonymous link which can be used to verify the source email address, and/or a QRCode which can be scanned to effectively click the link.

When the user 502 receives the email, the user clicks 522 the link or scans the QRCode, and this sends 524 a notification to the cloud service 6.

When the cloud service 6 receives 526 the notification, the cloud service 6 locates the user record from the anonymous data in the link, and marks 528 the user state as verified.

The cloud service 6 then sends 530 a message back to the user 502 to confirm that the new user account has been opened.

The user enrolment process 500 assumes either a single-organisation or single-tenant system, or a multi-organisation or multi-tenant system where the organisation or tenant is selected by matching the domain as specified in the email address of the user, or by some other method not covered by this invention.

In the user enrolment process 500, OAuth2 or other standard user authentication patterns could be used for the user authentication and password management, but in this case the user key may need to be kept in plaintext in the database 7 of the cloud service 6, or the user key may be omitted entirely.

In the user enrolment process 500, two factor authentication could be built into the (user) authentication flow.

Figure 6:
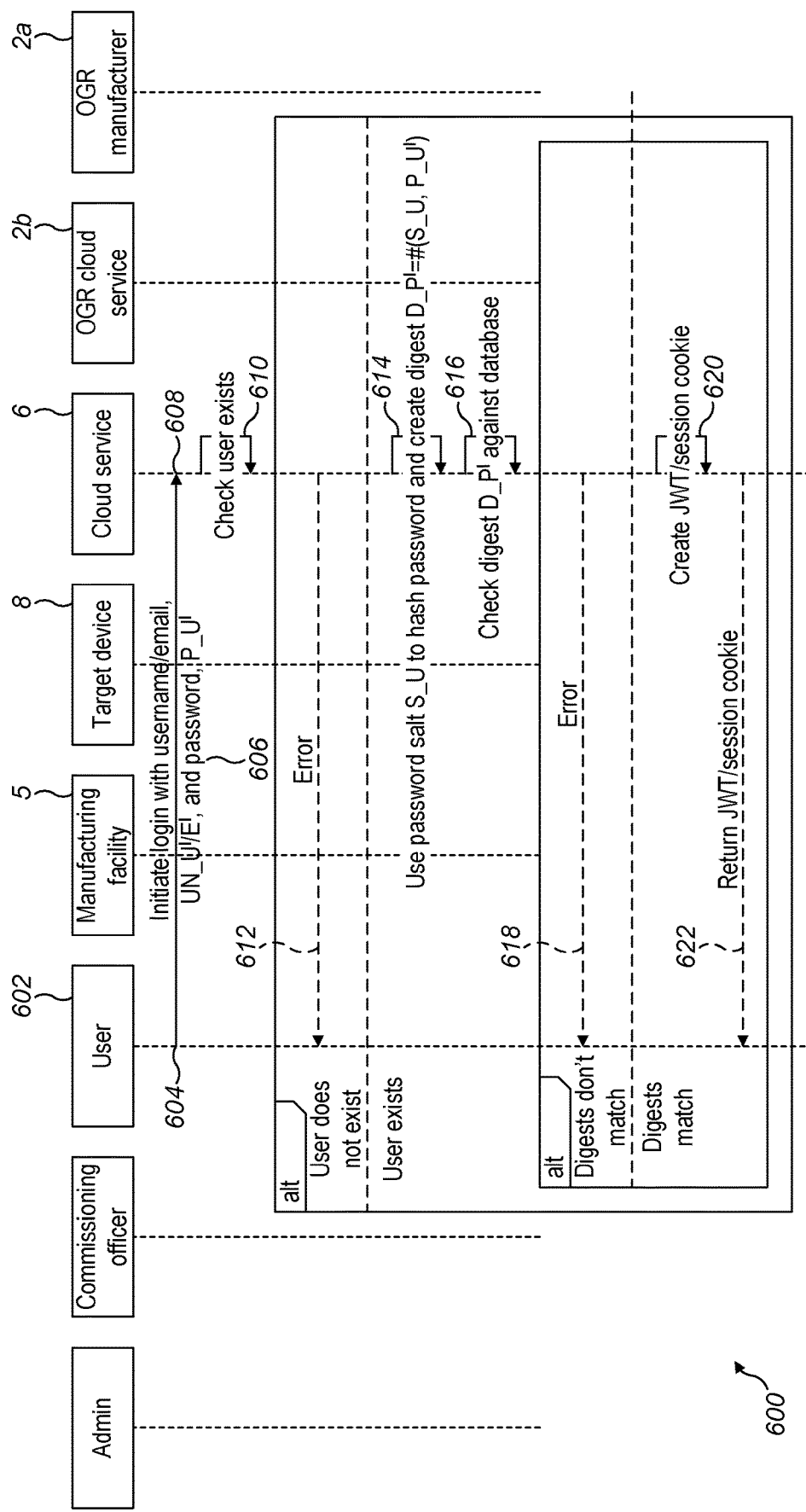
FIG. 6 is a schematic diagram illustrating a user authentication process useable in the first and second embodiments of FIGS. 1 and 2.

FIG. 6 is an illustrative example of a detailed user only authentication process which may be used to enable user management in the illustrated first and second embodiments. The user only authentication process of FIG. 6 is not used in the key provisioning process 300 of FIG. 3.

In the user only authentication process 600 shown in FIG. 6, the process 600 begins when a user 602 initiates 604 a login request 606 with the cloud service 6 providing their user name, UN_U', or email, E', and their password, P_U'.

On receiving 608 the login request 606, the cloud service 6 checks 610 whether a corresponding user account exists, and if not, returns an error 612. Alternatively, if a corresponding user account does exist, the cloud service 6 locates the user record in the database 7 and uses S_U from the user record to create 614 a new digest, wherein:

$D\_P'=\#(S\_U,P\_U')$

The cloud service 6 then verifies whether the new digest matches the digest in the database to check 616 whether the provided password is correct. If the provided password is not correct, the cloud service 6 returns an error message 618. Alternatively, if the provided password is correct the cloud service 6 creates 620 a user JWT and sends the user JWT 622 to the browser or app of the user 602 for use in future API calls. The cloud service 6 will then record the role and permissions of the user 602 in the user JWT scope.

Similarly to the user enrolment process 500 described above, OAuth2 or other standard patterns could be used instead.

Figure 7:
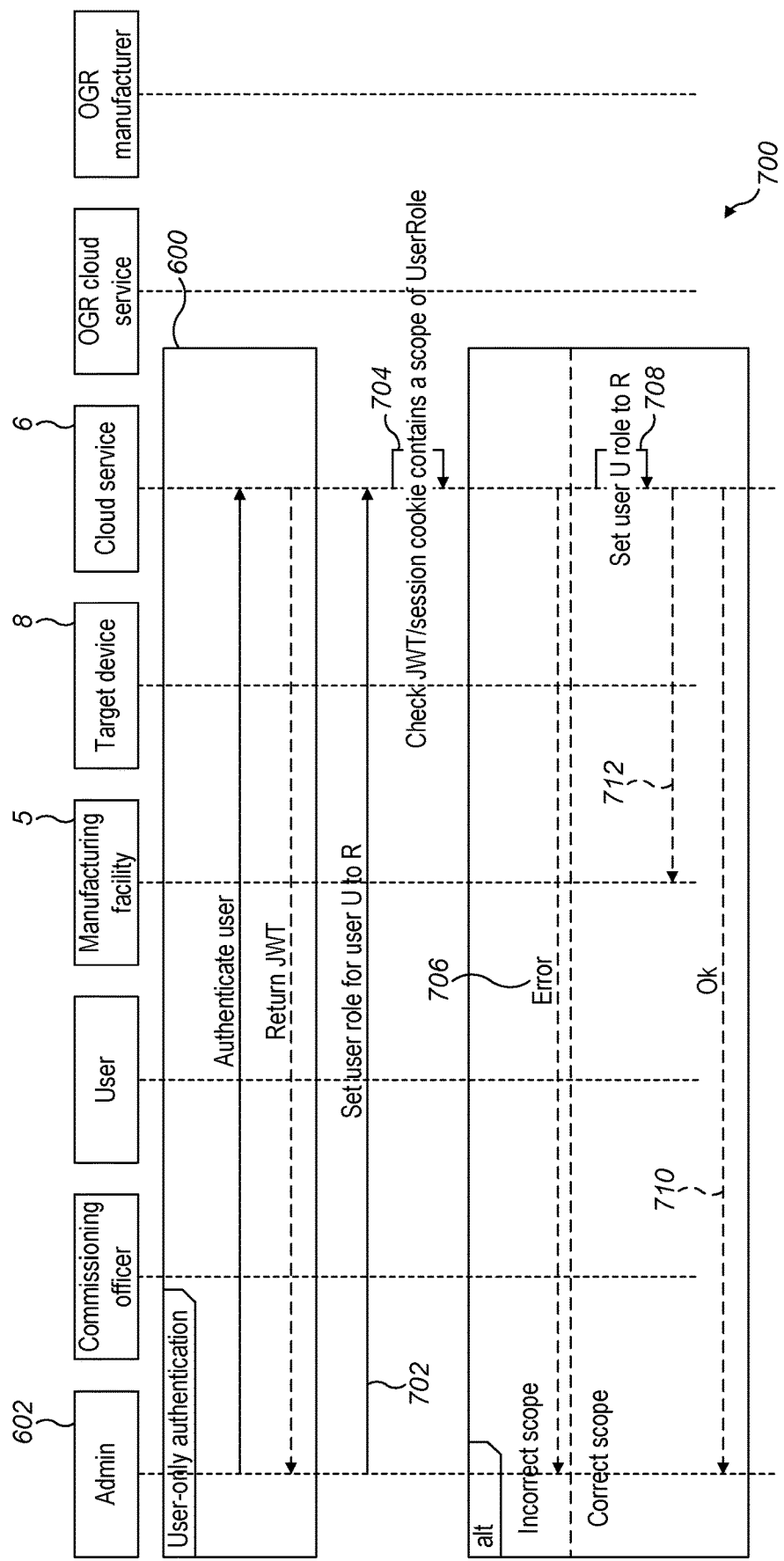
FIG. 7 is a schematic diagram illustrating a user role setting process useable in the first and second embodiments of FIGS. 1 and 2.

FIG. 7 is an illustrative example of a detailed user role setting process which may be used to enable user roles to be set in the illustrated first and second embodiments. This process assumes that the first user created for a new organisation or tenant will be the initial admin for that organisation or tenant, as discussed above.

In the user role setting process 700 shown in FIG. 7, the process 700 begins when a user 602 authenticates using the user only authentication process 600 shown in FIG. 6, obtaining a user JWT.

The user 602 then requests 702 that the cloud service 6 sets the role of a user, U, to a specified role, R, passing the user JWT. For example, the user 602 may request that the cloud service 6 sets the role of user U to "commissioning officer".

Provided that the user JWT was returned from the user authentication process 600, the cloud service 6 then checks 704 whether the user JWT scope contains a scope which permits setting of a user role. This may be regarded as the user JWT scope identifying the user 602 as an administrator. If the user JWT scope does not contain this scope, or no user JWT was passed, then the cloud service 6 returns 706 an error and the operation terminates. Alternatively, if the user JWT scope does contain this scope, then the cloud service 6 finds the record for user U, and sets 708 the user role to the specified role R. If the record for user U cannot be found, the cloud service 6 returns 706 an error and terminates the operation.

The cloud service 6 then sends 710 an email to the administrator user 602 confirming that the user role of user U has been set to the specified role R. Optionally, the cloud service 6 may also send 712 an email to user U, and optionally some or all users with an administrator role or an audit role in the same organisation/tenant, informing them of the change in role and requesting that they report the change if they do not recognise it.

Similarly to the process 500 and 600 described above, OAuth2 or other standard patterns could be used instead.

Figure 8:
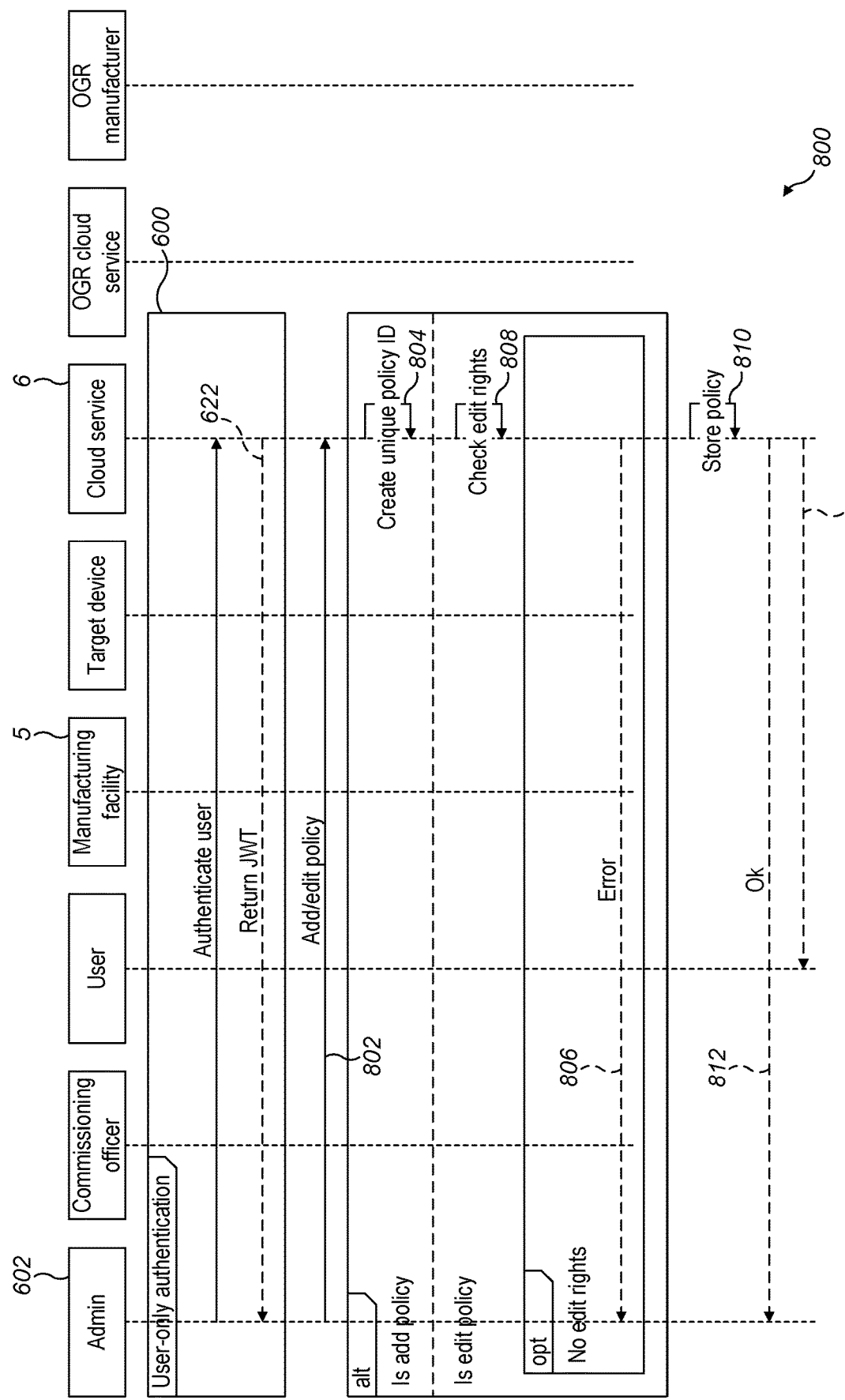
FIG. 8 is a schematic diagram illustrating a workflow step policy setting process which may be used in the process of FIG. 3.

FIG. 8 is an illustrative example of a workflow step policy setting process which may be used in the illustrated first and second embodiments.

In the workflow step policy setting process 800 shown in FIG. 8, the process 800 begins when a user 602 authenticates using the user only authentication process 600 shown in FIG. 6, obtaining a user JWT.

The user 602 then requests 802 that the cloud service 6 creates or updates a specified workflow step policy passing the user JWT.

Provided that the user JWT was returned from the user authentication process 600, if the request 802 was to create a workflow step, the cloud service 6 then checks 804 whether the user JWT scope contains a scope which permits the creation of a workflow step. If the user JWT scope does not contain this scope, or no user JWT was passed, then the cloud service 6 returns 806 an error and the operation terminates. Alternatively, if the request 802 was to update a workflow step, the cloud service 6 then checks 808 whether the user JWT scope contains a scope which permits the changing of a workflow step. If the user JWT scope does not contain this scope, or no user JWT was passed, then the cloud service 6 returns 806 an error and the operation terminates. Further, if the record for user U cannot be found, the cloud service 6 returns 706 an error and terminates the operation.

Alternatively, if the user JWT scope does contain the scope of the requested creation or updating of a workflow step, then the cloud service 6 stores 810 the requested created or updated workflow step policy.

The cloud service 6 then sends 812 a confirmation to the administrator user 602 that the requested change has been made. Optionally, the cloud service 6 may also send 814 an email to user U, and optionally some or all users with an administrator role or an audit role in the same organisation/tenant, informing them of the change in workflow step policy and requesting that they report the change if they do not recognise it.

Figure 9:
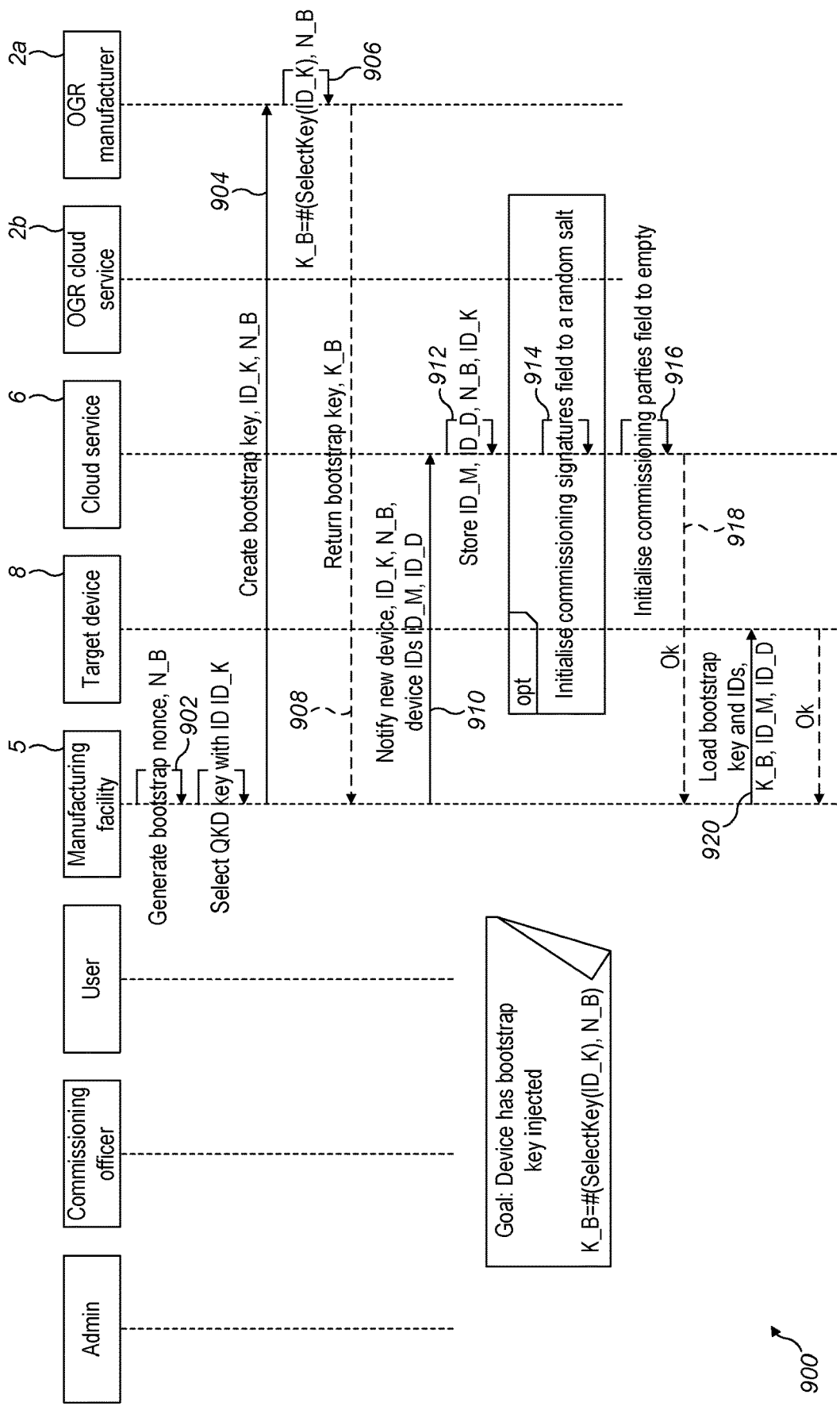
FIG. 9 is a schematic diagram illustrating a bootstrap key injection process which may be used in the process of FIG. 3.

FIG. 9 is an illustrative example of a bootstrap key injection process which may be used in the illustrated first and second embodiments.

In order to carry out the bootstrap key injection process there must be a workflow step policy available at the point of manufacture, for example at the manufacturing facility 5. This may be a default workflow step policy. The workflow step policy can be overwritten later by a user having appropriate permissions. How such permissioning and role management is carried out across organisations is not specified herein, and may be matched to the requirements of the organisations.

In the bootstrap key injection process 900 shown in FIG. 9, the process 900 begins when the manufacturing facility 5 generates 902 a bootstrap nonce, N_B, for example at a bootstrap provisioning terminal of the manufacturing facility 5.

Then, the manufacturing facility 5 selects 904 the ID, ID_K, of a QKD key from the HSM 4a of their local OGR 2a, which QKD key is also shared with an OGR 2b connected to the cloud service 6.

Then, the manufacturing facility 5 sends 904 N_B and ID_K to the HSM 4a connected to their OGR 2a and asks it to create the bootstrap key, K_B. The HSM 4a of the OGR 2a creates 906 K_B, wherein:

K_B=#(SelectKey(ID_K),N_B)

The OGR 2a then returns 908 K_B to the manufacturing facility 5.

Then, the manufacturing facility notifies 910 the cloud service 6 of a new target device 8, which has the following properties, manufacturer ID, and device ID, and passing the bootstrap nonce N_B. In some examples there may be additional parameters, or the identifier could instead be a simple guaranteed unique ID for the device, for example a 32 byte random number, or something like an IMEI number.

Then, the cloud service creates 912 a record for the target device and stores at least the following in the database 7 (other fields may be added as required, e.g. Service Provider):
Manufacturer ID: ID_M
Device ID: ID_D
QKD Key ID: ID_K
Bootstrap Nonce: N_B
Bootstrap Key: K_B (optional, see notes below)
Workflow Step Policy: Default policy
Workflow Ratchets: <empty array of keys>
Workflow Approvals: <empty array Workflow Step Approvals>
Workflow Step Index: 0

Further, the cloud service 5 initialises 914 the commissioning signatures field of the record to a random salt, and initialises 916 the commissioning parties field of the record to empty.

The cloud service returns 918 a success code to the manufacturing facility 5, and the manufacturing facility then injects 920 the following data into the target device 8:
Manufacturer ID: ID_M
Device ID: ID_D
Bootstrap Key: K_B The target device 8 then sends 822 a confirmation 824 to the manufacturing facility 5 that the injection 920 has been made.

As mentioned above the storing of the calculated bootstrap key in the database 7 of the cloud service 5 is optional. In the example above, the calculated bootstrap key is stored in the database 7 to avoid the HSM 4b having to keep the QKD key indefinitely for future bootstrap key calculations (i.e. to avoid each authentication having to calculate the bootstrap key anew). This opens up a potential attack vector, as the bootstrap key may then be available for a database attacker to read, but also reduces another possible attack vector whereby deletion of the QKD Key from the HSM 4b would prevent any target device 8 whose bootstrap key is derived from it from being able to authenticate. In some examples the bootstrap key could be stored in the database 7 wrapped by a key stored in a tenant specific HSM, for example, to protect it. In alternative examples the calculated bootstrap key is not stored in the database 7, and each authentication calculates the bootstrap key anew from the QKD key.

In an alternative approach, instead of using QKD to calculate a bootstrap key which is then injected into the target device, the manufacturing facility 5, or other enterprise, could generate and inject their own bootstrap key into the target device 8, and then register this bootstrap key, or the hash of the bootstrap key, with the cloud service 5 over a classically secure, post-quantum cryptographically secure, quantum secure, or manually secured link. The authentication flow would then use their manufacturing facility 5 bootstrap key, or the hash of this bootstrap key, stored in the bootstrap key field in the database 7 as the first key in the chain, instead of a key calculated by the OGR/HSM by combining a nonce with a QKD key.

The above example is described with reference to a satellite system 100 according to the first embodiment. In a terrestrial system 200 according to the second embodiment the OGR 2a would be replaced by the terrestrial transceiver 9a.

In some circumstances, it may be desirable to change the workflow step policy associated with a target device 8. As discussed above, this may, for example, be necessary where a bootstrap key has been injected into a target device 8 using a default workflow step policy.

The workflow step policy can be changed by a user who has been authenticated using the authentication process 600 and obtained a JWT requesting that the cloud service 5 associates a new workflow step policy to a given target device 8. The cloud service 5 then checks that the JWT scope contains a scope which permits it to associate a workflow step against a target device 8. The cloud service 5 then locates the record relating to the target device 8, updates the device record for the target device 8 to point to the new workflow step policy, and zeros the workflow ratchets and workflow commissioning records of the device record for the target device 8. Optionally, the cloud service 6 may send an email to the user, and optionally some or all users with administrator or audit roles, informing them of the change in assigned workflow or policy to the specific target device 8 and requesting that they report the change if they do not recognise it.

It will be understood that updating the workflow step for a target device 8 effectively forces the target device 8 to reset back to the uninitialized bootstrap or factory state as all ratchet keys are zeroed, leaving the device with only the bootstrap key able to successfully authenticate.

Figure 10:
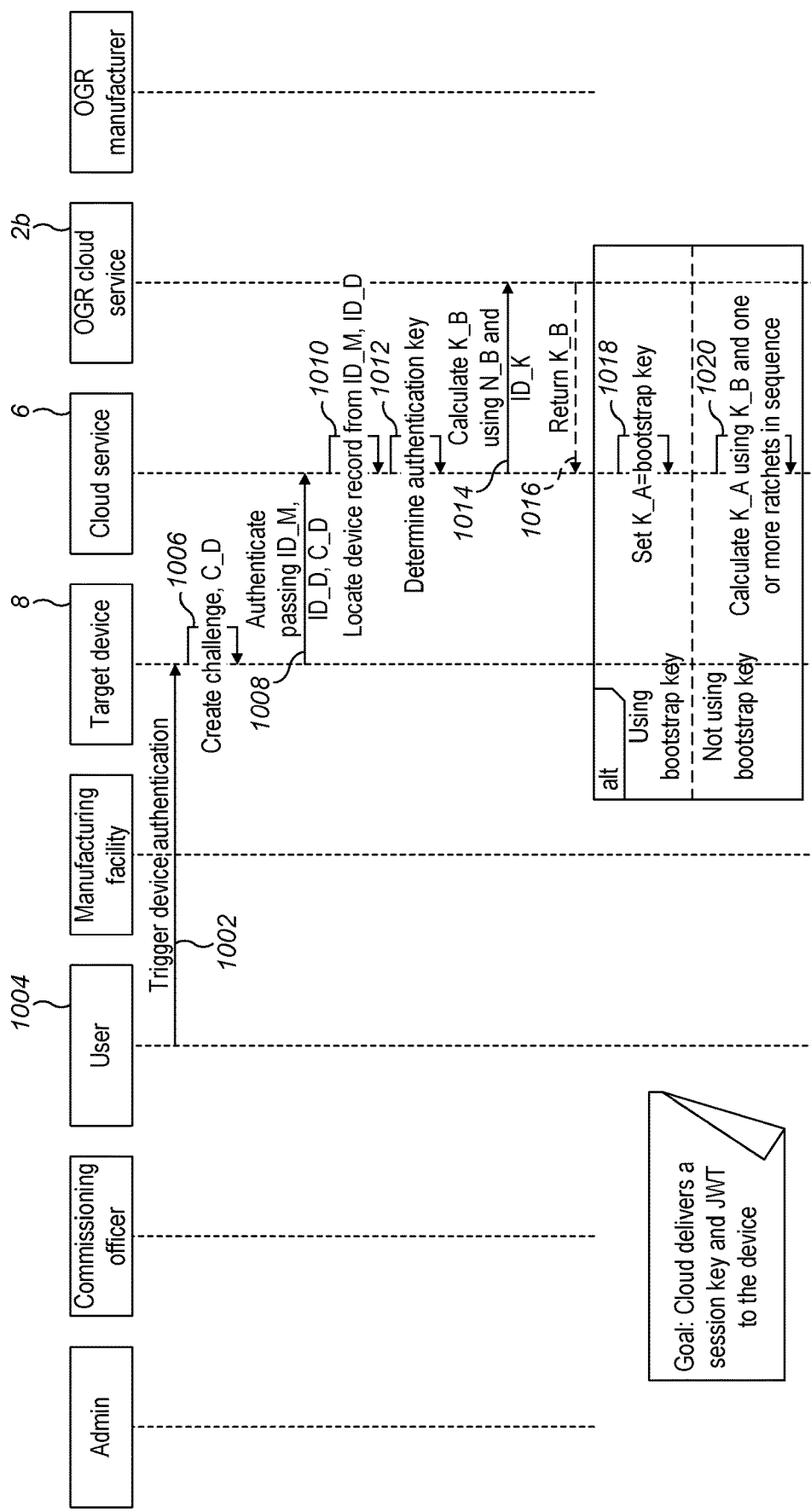
FIG. 10 is a schematic diagram illustrating a device authentication process which may be used in the process of FIG. 3.
Figure 10:
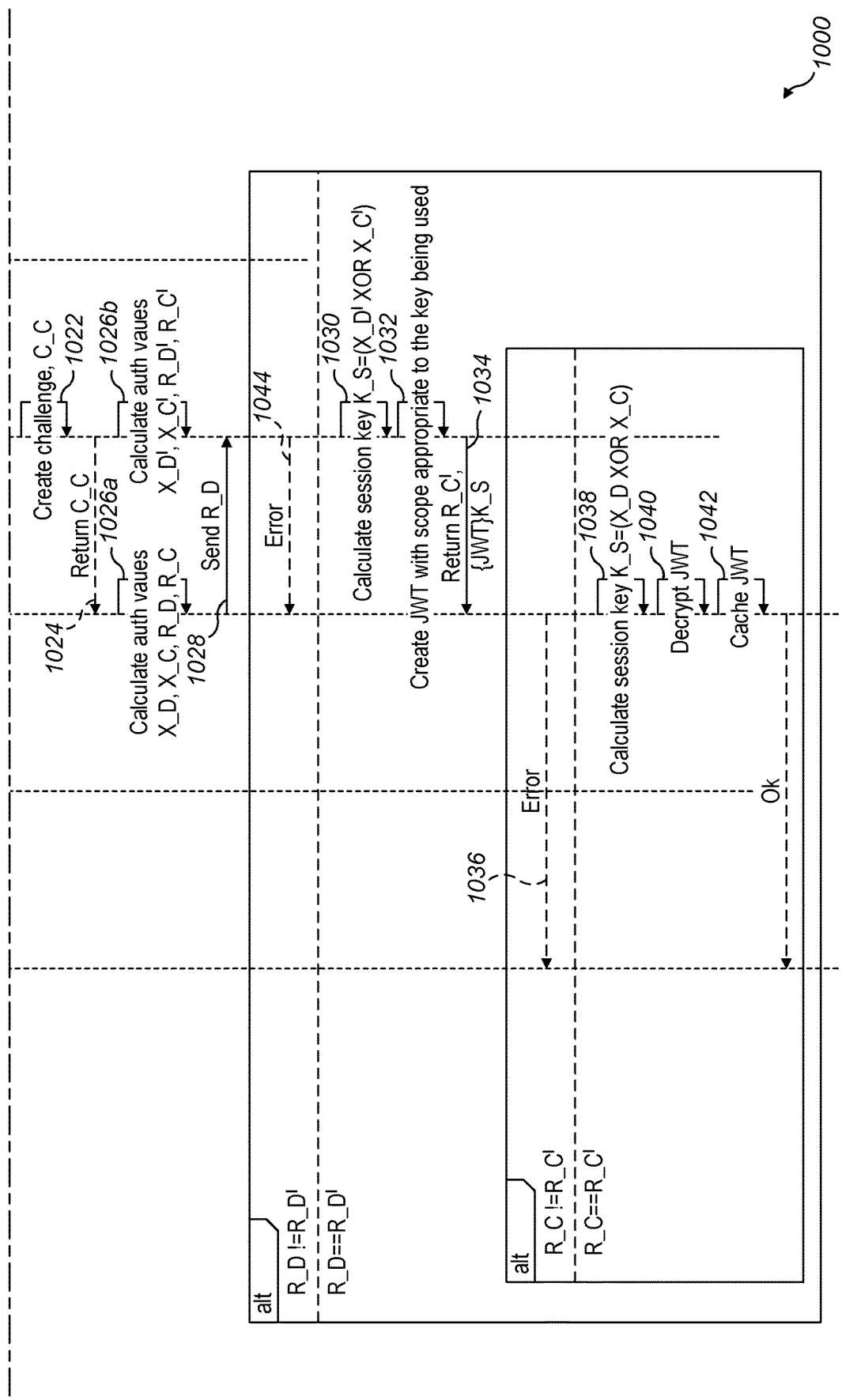

FIG. 10 is an illustrative example of a detailed target device authentication process which may be used to authenticate a target device 10 to the cloud system 6 in the illustrated first and second embodiments.

In the target device authentication process 1000 shown in FIG. 10, the process 1000 begins when a target device 8 initiates 1002 the authentication flow in response to some external stimulus. This external stimulus may, for example, be a user 1004 attempting to connect the target device 8 to the cloud system 6, or may, for example, be the target device 8 booting and running a bootloader which starts the authentication flow. The target device 8 creates 1006 a challenge code C_D, and, optionally, a timestamp T_D, and requests authentication to the cloud service 6, passing 1008 the following information: ID_M, ID_D, C_D, T_D.

In response to receiving the authentication request, the cloud service 6 locates 1010 the device record in the database 7 corresponding to the target device 8, and determines whether the bootstrap key for the target device 8 is stored in the database 7.

If the bootstrap key is stored in the database 7, the cloud service 6 recovers 1012 the bootstrap key. Alternatively, if the bootstrap key is not stored in the database 7, the cloud service 6 recover ID_K from the database 7 and sends N_B and ID_K to the HSM 4b connected to the OGR 2b of the cloud service 6, and requests 1014 the HSM 4b to calculate the Bootstrap Key, K_B, as:

$$K\_B = \#(SelectKey(ID\_K), N\_B)$$

The HSM 4b then provides 1016 the requested bootstrap key to the cloud service 6.

If the device record in the database 7 indicates that the target device 8 is in the bootstrap state, a key, K is set 1018 to the bootstrap key, K_B. Alternatively, if the device record indicates that the target device 8 is not in the bootstrap state, the Cloud Service walks through the key ratchets stored in the Target Device record's Workflow Ratchets array, ratcheting the key, to calculate 1020 the key K:

$$K[0] = \#(K\_B, R[0]), \text{ and}$$

$$K[n] = \#(K[n-1], R[n]) \text{ for } n=1 \text{ to(Workflow Step Index}-1), \text{then}$$

$$K = K[n]$$

Alternatively, if the ratchets have been collapsed into a single value K_CX (see below), the key K can be calculated 1020 as:

$$K = K\_B \text{ XOR } K\_CX$$

The cloud service 6 then creates 1022 a challenge code, C_C, and, optionally a timestamp T_C, and returns 1024 the challenge code and the timestamp (if applicable) to the target device 8. The cloud service 6 may also return the ID of the cloud service, ID_CS, to the target device 8.

In instances where the cloud service 6 and target device 8 have exchanged timestamps, both the cloud service 6 and the target device 8 may check that the timestamps they exchanged are within a predetermined time window. For example, the cloud service 6 and target device 8 may check that the timestamps they exchanged are within 1 second or less of each other. If the timestamps are determined not to be within the predetermined time window, the authentication may be rejected.

Then, in parallel, the cloud service 6 and the target device 8, calculate 1026a and 1026b, the authentication values using the key they expect to use to authenticate, K:

$$X\_D = \#(K, C\_D, 0)$$

$$X\_C = \#(K, C\_C, 1)$$

$$R\_D = \#(X\_D\ C\_C)$$

$$R\_C = \#(X\_C, C\_D)$$

The 0 and 1 add directionality and ensure that a mirror attack can't happen if a rogue server simply returns C_D as C_C leading to K_S=(0,0,0,0,0,0,0,0,0 . . . ).

Alternatively, the cloud service 6 and the target device 8, may respectively (and in parallel) calculate 1026a and 1026b, the authentication values using the key they expect to use to authenticate, K according to the following process:

$$N\_D=\#(C\_D,ID\_M,ID\_D,T\_D)$$

$$N\_C=\#(C\_C,ID\_CS,T\_C)$$

$$X\_D=\#(K,N\_D,0)$$

$$X\_C=\#(K,N\_C,1)$$

$$R\_D=\#(X\_D,N\_C)$$

$$R\_C=\#(X\_C,N\_D)$$

Then, the target device 8 sends 1028 R_D to the cloud service 6. The cloud service 6 compares the R_D received from the target device 8 to the R_D calculated by the cloud service 6, and if R_D received from the target device matches R_D calculated by the cloud service 6, the cloud service 6 creates 1030 a session key, K_S:

$$K\_S = X\_D \text{ XOR } X\_C$$

Further, the cloud service 6 creates 1032 a JWT with a scope appropriate to the key being used to authenticate.

The cloud service 6 then returns 1034 R_C that it calculated, the JWT, and the session key encrypted with a key that is known only to the cloud service 6, K_CS, all encrypted by the session key to the target device 8. The K_CS is provided to allow the use of RESTful APIs, so that future API calls will pass up the encrypted session key so that it does not need to be cached in the cloud service 6. The use of K_CS and RESTful APIs is optional.

$$R\_C,\{JWT,\{K\_S\}K\_CS\}K\_S$$

The target device 8 then compares the R_C returned from the cloud service with the R_C calculated by the target device 8. If the R_C returned from the cloud service 6 does not match the R_C calculated on the target device 8, the target device 8 displays 1036 an error message to the user 1004. Alternatively, if the R_C returned from the cloud service 6 matches the R_C calculated on the target device 8, the target device 8 calculates 1038 the session key K_S from its locally calculated value:

$$K\_S = X\_D \text{ XOR } X\_C$$

The target device 8 then decrypts 1040 the JWT, and decrypts 1042 {K_S}K_CS, both received from the cloud service.

The target device can then use the session key, K_S, the JWT, and {K_S}K_CS when making further API calls in this session.

Alternatively, if R_D received from the target device 8 does not matches R_D calculated by the cloud service 6, the cloud service 6 returns an error message 1044 to the target device 8.

In response to this error message 1044, the target device 8 should attempt to authenticate again using the bootstrap key, as a key revocation (factory reset) process may have occurred which has removed all key ratchets in the cloud service 6. If this further authentication attempt also fails, the target device 8 cannot authenticate and an audit and log of the failure is created. Further defences may be employed, for example, preventing more than a specified number, for example 3, authentication attempts from a specific IP address within the space of an hour, or blocking further authentication attempts for the device from any IP address within the space of an hour.

Optionally, on successful authentication with any authentication key that is not the bootstrap key, in order to provide forward security, the current ratchet key may be ratcheted forward using the Bootstrap Key (or some other value known to both the Target Device and the cloud service):

K'=#(K_B, K), where K is the latest key in the array of keys on the Target Device, and where K_B is the bootstrap key, and K' replaces K in the database.

In examples where this is done, in response to the error message 1044, the target device 8 should first attempt to authenticate again after ratcheting forward its last ratchet, using a scheme equivalent to the scheme used following successful authentication, in case the post authentication ratchet was successful in the Cloud Service but failed on the Target Device at the last authentication. Then, if this authentication attempt also fails, the target device 8 should attempt to authenticate again using the bootstrap key as discussed above.

Additionally or alternatively, the current ratchet may be initialised (if the bootstrap key itself was used for the first authentication), or replaced as follows:

K=#(X_D, X_C), if the bootstrap key was used for first authentication, where K is the Workflow Ratchet initialised in the database, or K'=#(K, X_D, X_C), where K is the current Workflow Ratchet associated with the Workflow Step Index, and K' replaces K in the database.

Figure 11:
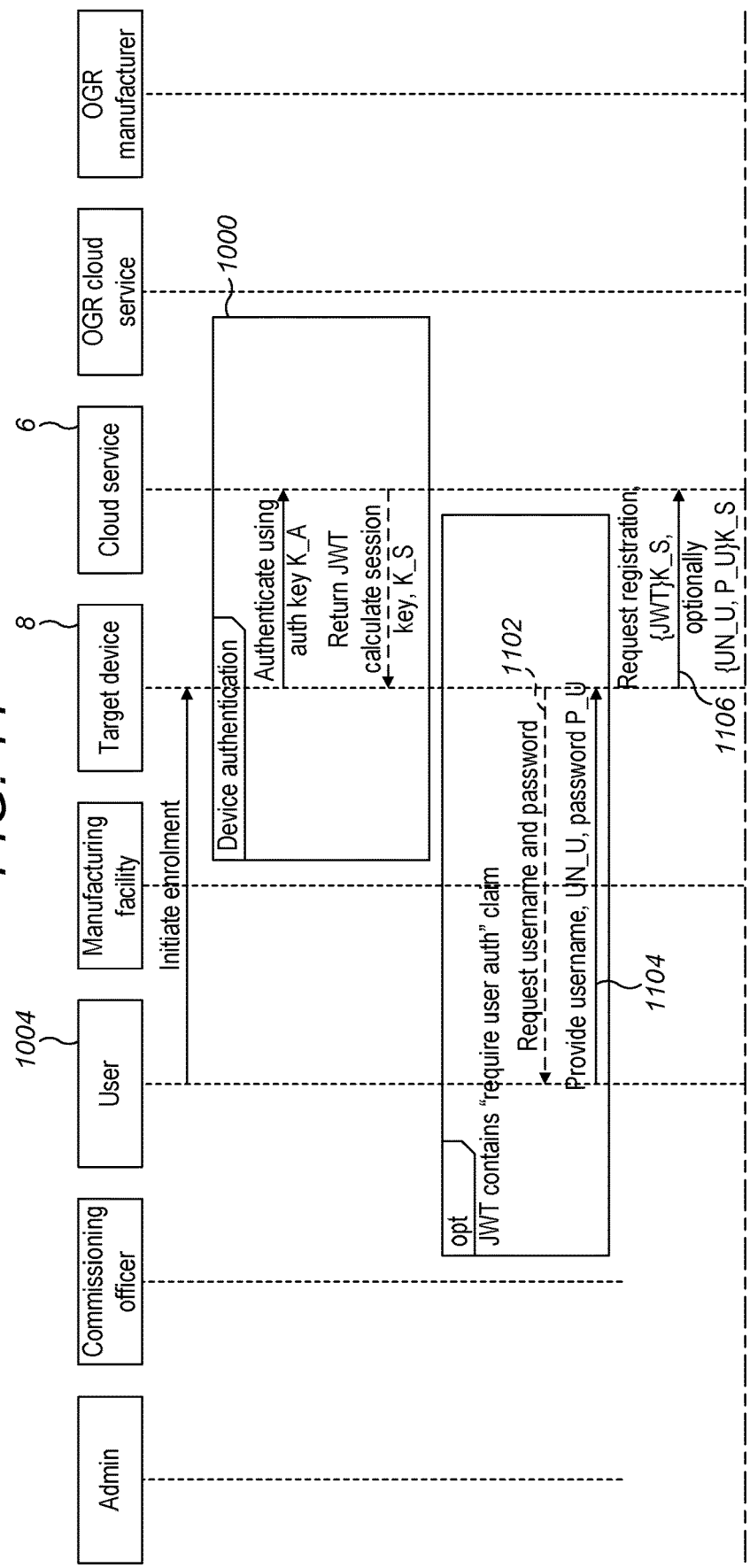
FIG. 11 is a schematic diagram illustrating a device enrolment process which may be used in the process of FIG. 3.
Figure 11:
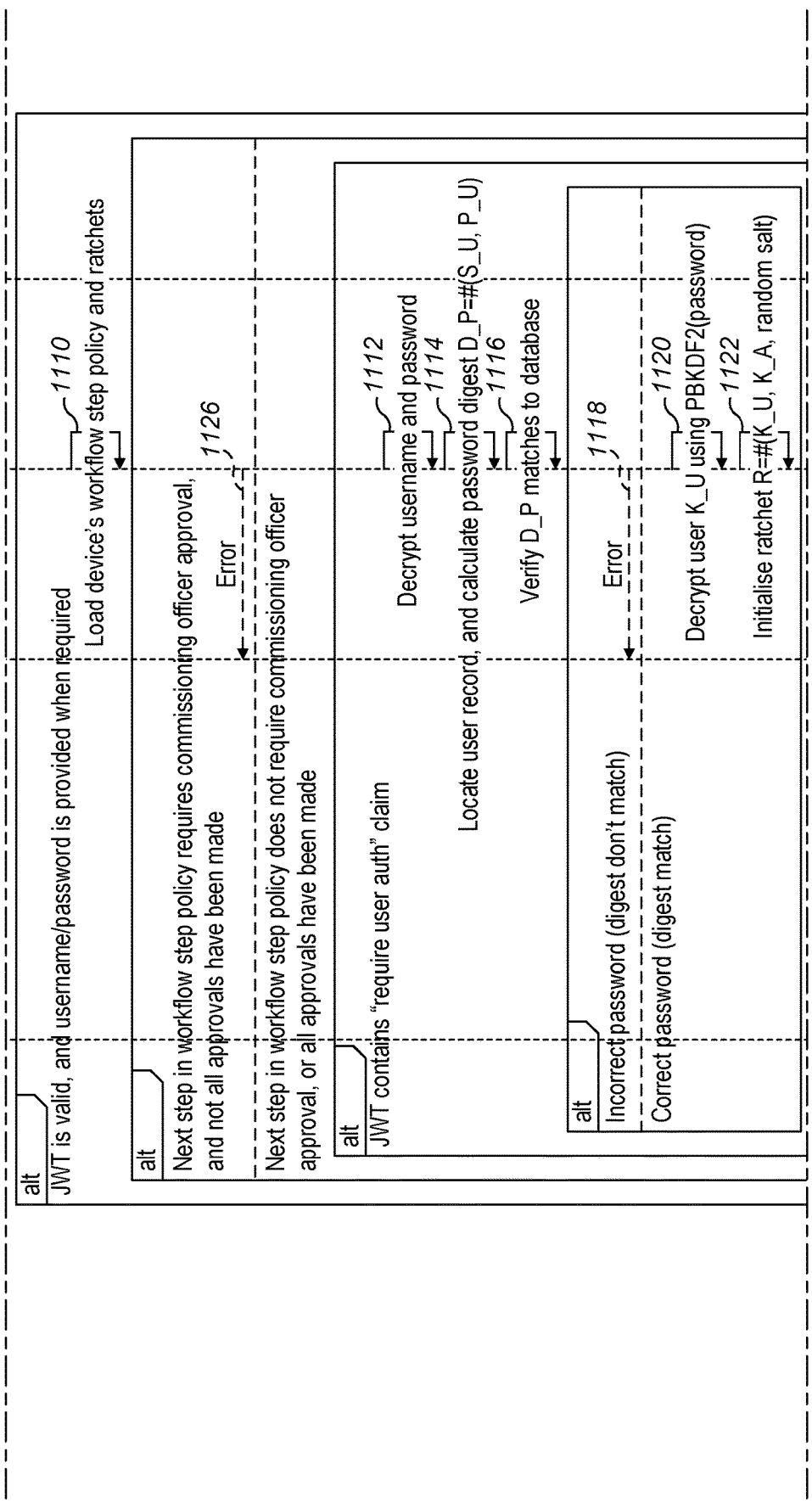
Figure 11:
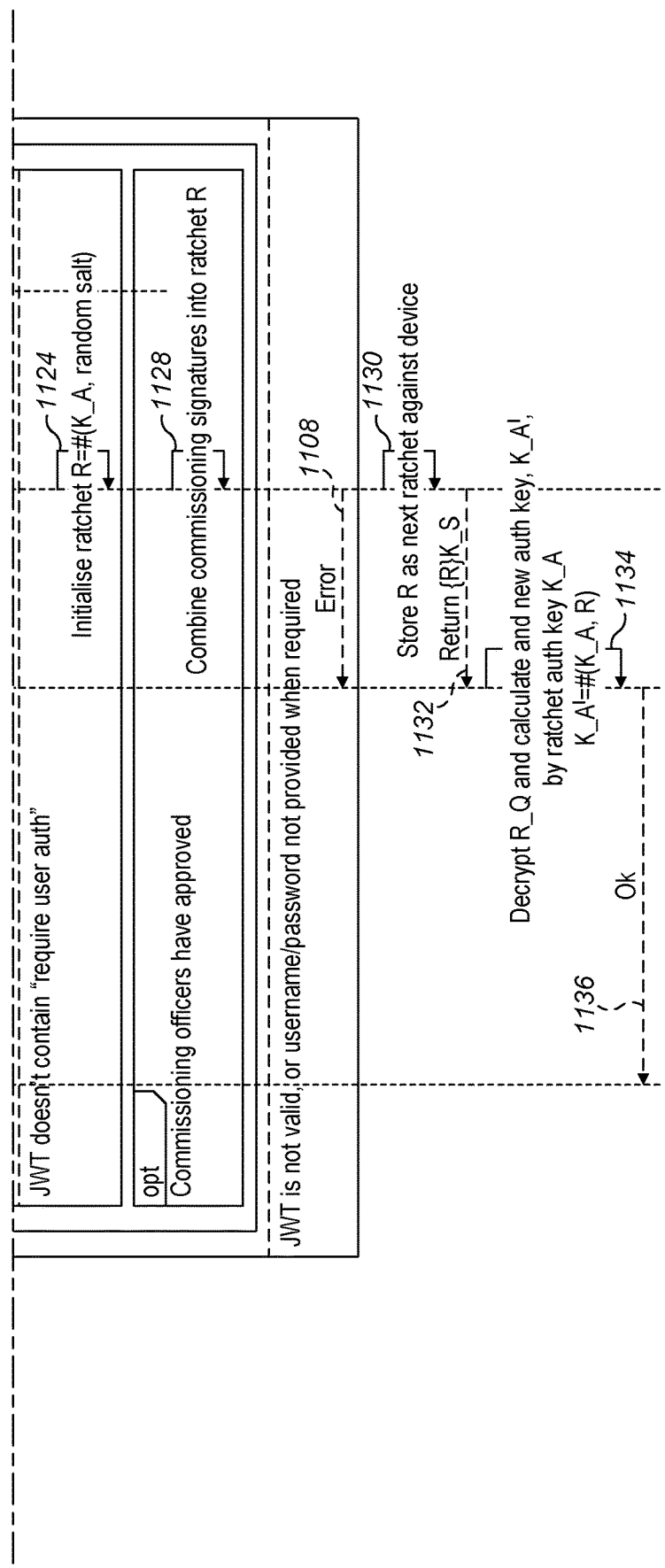

FIG. 11 is an illustrative example of a detailed target device enrolment process which may be used to enrol a target device 10 to the cloud system 6 in the illustrated first and second embodiments.

In the target device enrolment process 1100 shown in FIG. 11, the process 1100 is triggered by a user or via some other method. The target device 8 executes the device authentication process 1000 using the latest ratchet key in its possession. The cloud service 6 maintains a state for the target device 8 which defines the current workflow step in the chain of workflow steps for the target device 8. This state starts at 0, meaning that the first enrolment step by the target device 8 will use the first workflow step in the array of workflow steps defined in the workflow step policy for the target device 8.

If the JWT returned from the device authentication process 1000 includes the claim "require user auth", or the cloud service 6 returns a flag that informs the target device 8 that user authentication is required, then the target device 8 requests 1102 username and password from the user 1004, and the user 1004 provides 1104 their username and password. In some examples, an alternative authentication method may be used instead of, or in addition to, a password.

Then, the target device 8 requests 1106 for the cloud service 6 to enrol the target device 8, the request 1106 providing the username and password (if required) secured by the session key, the JWT, and the encrypted session key:

$$\{K\_S\}K\_CS, \{JWT\}K\_S, \text{ and optionally} \{UN\_U',\ P\_U'\}K\_S$$

Then, the cloud service 6 decrypts and validates the session key using K_CS, and returns an error if the session key is not valid. If the session key is valid, the cloud service 6 decrypts and validates the JWT using the session key, and returns an error 1108 if the device JWT is not valid, or does not contain the required scopes to access the API.

Alternatively, if the session key and the device JWT are valid, the cloud service 6 loads 1110 the workflow step policy, workflow ratchets, and workflow commissioning for the target device 8 from the target device 8 record in the database 7, and creates a random salt S_E.

Then, if the active workflow step (as defined by the workflow step index) requires user authentication, the cloud service 6 decrypts the username, UN_U, and password, P_U. The cloud service 6 then locates 1114 the user record in the database 7 and uses S_U to create a new digest from P_U. The cloud service 6 then uses the new digest to check whether the password is correct by verifying 1116 whether the new digest matches the digest in the database 7.

If the digests do not match, the password is incorrect and the cloud service 6 returns an error 1118. Alternatively, if the digests match, the password is correct and the cloud service 6 decrypts 1120 the user key, K_U, by using PBKDF2(P_U') or equivalent, and the ratchet, R is initialised 1122:

R=#(K_U, K, S_E) where K is the device authentication key

The username is then stored in the user authenticator field of the latest workflow commissioning record, as defined by the workflow step index, for the target device 8.

Alternatively, in cases where the active workflow step does not require user authentication, the ratchet R is initialised 1124:

R=#(K, S_E) where K is the device authentication key

If the active workflow step in the workflow step policy requires commissioning officer approval, then the cloud service 6 checks that the required signatures identified in the commissioning officer signatures and commissioning officer parties fields for the active step (as defined by the workflow step index) match those in the workflow step policy for that step. If these do not match, then the enrolment fails, the cloud service 6 sends an error 1126, and appropriate audits and logs are created. Alternatively, if the commissioning officer signatures and commissioning officer parties fields for the active step match those in the workflow step policy for that step, then the cloud service 6 combines 1128 the ratchet, R, with the commissioning signatures, S_C, to form a new ratchet, R':

$$R'=\#(R,S\_C)$$

The cloud service 6 then stores 1130 the former ratchet, R, or the latter ratchet, R', as appropriate, in the current workflow ratchet array index (as defined by the Workflow Step Index), and then increments the device workflow step index, thus transitioning the target device to the next state.

If the active workflow step in the workflow step policy requires both user authentication and commissioning officer approval, the cloud service 6 does not proceed to initialise a new ratchet until the matches of both the user password and the commissioning officer signatures and commissioning officer parties fields have been confirmed.

Optionally, in order to allow previous ratchets to be confidential, the cloud service 6 could collapse all of the ratchets into a single collapsed XOR value, K_CX, which is then XORd with the bootstrap key to form the latest ratchet key:

K_CX=#(K, R) XOR K_B where K is the device authentication key or

K_CX=#(K, R') XOR K_B where K is the device authentication key and then subsequently, the latest key ratchet key used for the next authentication would simply be:

$$K\_R = K\_B \text{ XOR } K\_CX$$

In either case, the cloud service 6 returns 1132 to the target device 8 the new ratchet R or R' encrypted by the session key:

$$\{R\}K\_S \text{ or } \{R'\}K\_S$$

The target device 8 then decrypts R or R' using the session key and uses R or R' to calculate 1134 the latest ratchet key, K_R', from the latest ratchet key it holds, K_R:

$$K\_R'=\#(K\_R,R) \text{ or}$$

$$K\_R'=\#(K\_R,R')$$

The target device 8 then adds K_R' to the array of keys held on the target device 8 and uses this key from now on for authentication, and the target device returns 1136 an OK message to the user 1004.

Figure 12:
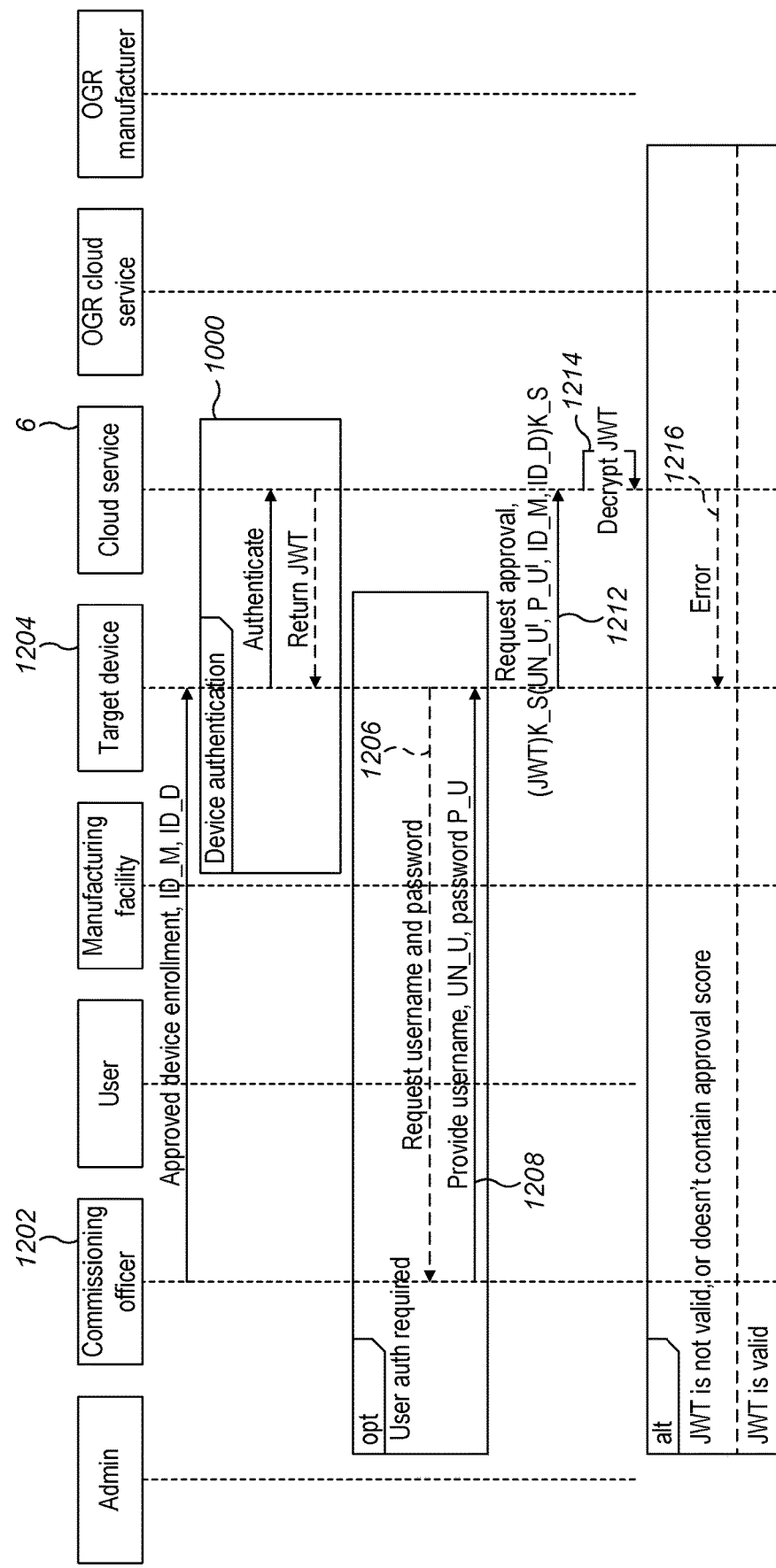
FIG. 12 is a schematic diagram illustrating a commissioner approval process which may be used in the process of FIG. 3.
Figure 12:
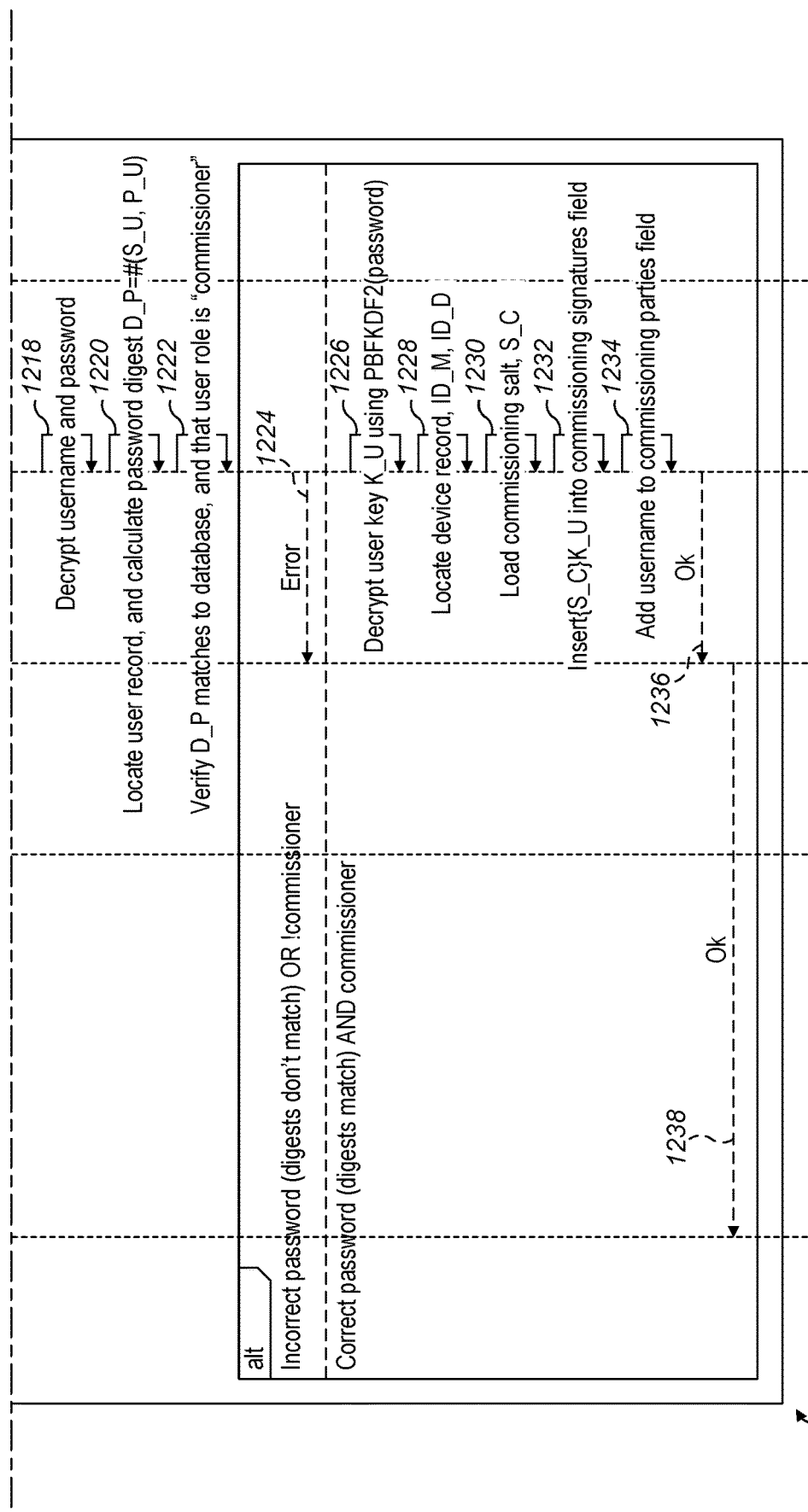

FIG. 12 is an illustrative example of a commissioner approval process which may be used to approve a workflow step in the illustrated first and second embodiments.

In the commissioner approval process 1200 shown in FIG. 12, the process 1200 is triggered by a commissioning role user 1202 using a control device 1204 which has previously been authorised by the processes set out above. This control device 1204 will execute the device authentication process 1000 using the latest ratchet keys in its possession to obtain a control device JWT.

The control device 1204 requests 1206 username and password from the commissioning user 1202, and the commissioning user 1202 provides 1208 their username and password to the control device 1204. In some examples, an alternative authentication method may be used intead of, or in addition to, a password.

Optionally, the control device 1204 may provide some entropy, E; this could be, for example, be done by the commissioning officer 1202 shaking the control device 1204 for several seconds while an accelerometer in the control device 1204 generates some entropy, or where the commissioning officer 1202 draws something on a screen of the control device 1204, or the control device takes entropy from a random number generator (RNG) or even an OGR 2.

The control device 1204 obtains a session key K_S calculated during the device authentication process 1000, and requests 1212 that the cloud service 6 approves the next enrolment state for the given device, passing the control device JWT encrypted by the session key, and the target device identifiers ID_M and ID_D, and username UN_U' and password P_U', again encrypted by the session key:

{K_S}K_CS, {JWT}K_S, {UN_U', P_U', ID_M, ID_D}K_S, or

{K_S}K_CS, {JWT}K_S, {UN_U', P_U', ID_M, ID_D, E}K_S, if entropy is provided

The cloud service 6 then decrypts and validates the session key using K_CS, and decrypts and validates 1214 the control device JWT, and returns an error 1216 if the control device JWT is not valid, or does not contain a scope granting permission to this function.

Alternatively, if the session key and the control device JWT are valid, the cloud service 6 decrypts 1218 the username, UN_U', and password, P_U', and optionally the entropy, E. The cloud service 6 then locates 1220 the user record and uses S_U to create a new digest:

$$D\_P'=\#(S\_U,P\_U')$$

Then, the cloud service 6 uses the new digest to check whether the password is correct by checking 1222 that the new digest matches that in the database, and that the user role is commissioner, and if not the cloud service 6 returns 1224 an error and the operation terminates (and an audit and log is created).

Alternatively, if the new digest matches that in the database, and the user role is commissioner, the cloud service 6 decrypts 1226 the User Key, K_U, by using PBKDF2(P_U') or equivalent. The cloud service 6 then locates 1228 the current workflow step approvals record (as defined by the workflow step index) for the specified target device 8, and loads 1230 the commissioning salt S_C from that record.

The cloud service 6 then encrypts, signs or hashes the commissioning salt S_C with K_U, and optionally including device ID, workflow step ID ID_W, the current time, and other data as required, and stores 1232 the result in the commissioning officer signatures field of that record:

SIG={S_C}K_U or {S_C,ID_M,ID_D,ID_W, TIME}K_U

Alternatively, if entropy is provided, the cloud service 6 locates the current workflow step approvals record (as defined by the workflow step index) for the specified target device 8, encrypts, signs, or hashes the commissioning salt S_C with the entropy, and optionally including further data as set out above, and stores the result in the commissioning officer signatures field of that record.

SIG={S_C,E}K_U, or {S_C,E,ID_M,ID_D,ID_W, TIME}K_U

The cloud service 6 adds 1234 the username to the commissioning parties field of that record, and returns 1236 an ok message to the control device 1204, which in turn displays 1238 the ok message to the user 1202.

The process 1200 described with reference to FIG. 12 is an "AND" policy, where all specified commissioning officers must sign in order to approve a workflow step. In some alternative examples different approval policies may be used. One possible type of alternative policy would be an "OR" policy, whereby only approval by one of the named commissioning officers is required. Alternatively, more complex policies could be used such as approval by "at least <n> of" the named commissioning officers is required. Further, in some examples the named commissioning officers able to provide approval may be a group defined in Active Directory, or some other directory service. This may simplify changing members of a group of commissioning officers, for example when personnel change.

Figure 13:
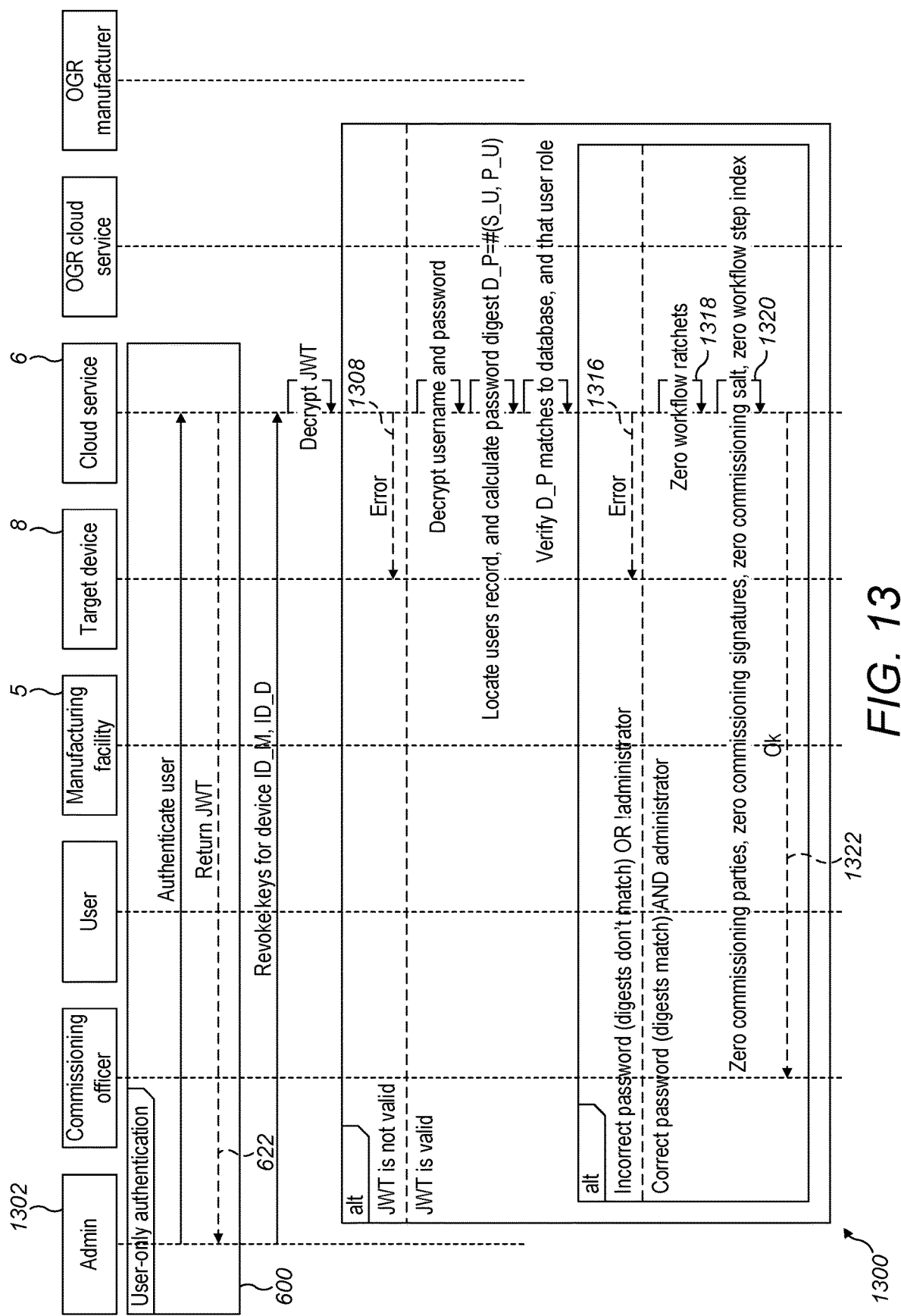
FIG. 13 is a schematic diagram illustrating a key revocation process which may be used in the process of FIG. 3.

FIG. 13 is an illustrative example of a detailed key revocation process which may be used to return a target device 10 to a bootstrap state in the illustrated first and second embodiments. This may be referred to as a factory reset.

In the key revocation process 1300 shown in FIG. 13, the process 1300 begins when an administrator user 1302 authenticates using the user only authentication process 600 shown in FIG. 6, obtaining a user JWT.

The user 1302 then requests 1304 that the cloud service 6 revokes the keys from a specified target device 8 having an identity ID passing the user JWT.

The cloud service 6 validates whether the user JWT is valid and contains a scope which confirms that the user is an administrator. If the user JWT is not valid, or does not confirm that the user is an administrator, the cloud service 6 returns 1308 an error and the operation terminates (and an audit and log is created).

Alternatively, the user JWT is valid and contains a scope which confirms that the user is an administrator, the cloud service 6 locates the device record of the target device 8 by ID in the database 7 and resets or clears 1318 the workflow ratchets. Further, the cloud service 6 resets or clears 1320 the workflow commissioning and sets the workflow step index to zero.

The cloud service 6 then returns 1322 an OK, and audits and logs are created.

Optionally the cloud service 6 can generate a new nonce N_B which is used with the QKD Key to calculate a new bootstrap key which is held temporarily in memory/cache, and the cloud service 6 can notify the target device 8 that all keys are being revoked, the target device 8 can authenticate to the cloud service 6 using the current bootstrap key in order to request access to the new bootstrap key. If the target device 8 confirms receipt of the new bootstrap key, then the new nonce N_B is stored in the database, overwriting the old nonce. If the target device 8 cannot be contacted then the old bootstrap key will need to remain in place It will be understood that in the embodiments described above, the final encryption key is a symmetric encryption key which can be used by the target device 8 and the cloud service 6 as a shared secret key to enable the target device 8 to be authenticated to the cloud service 6, to negotiate session keys, and for other purposes. The final encryption key may be an AE256 symmetric key.

Figure 14:
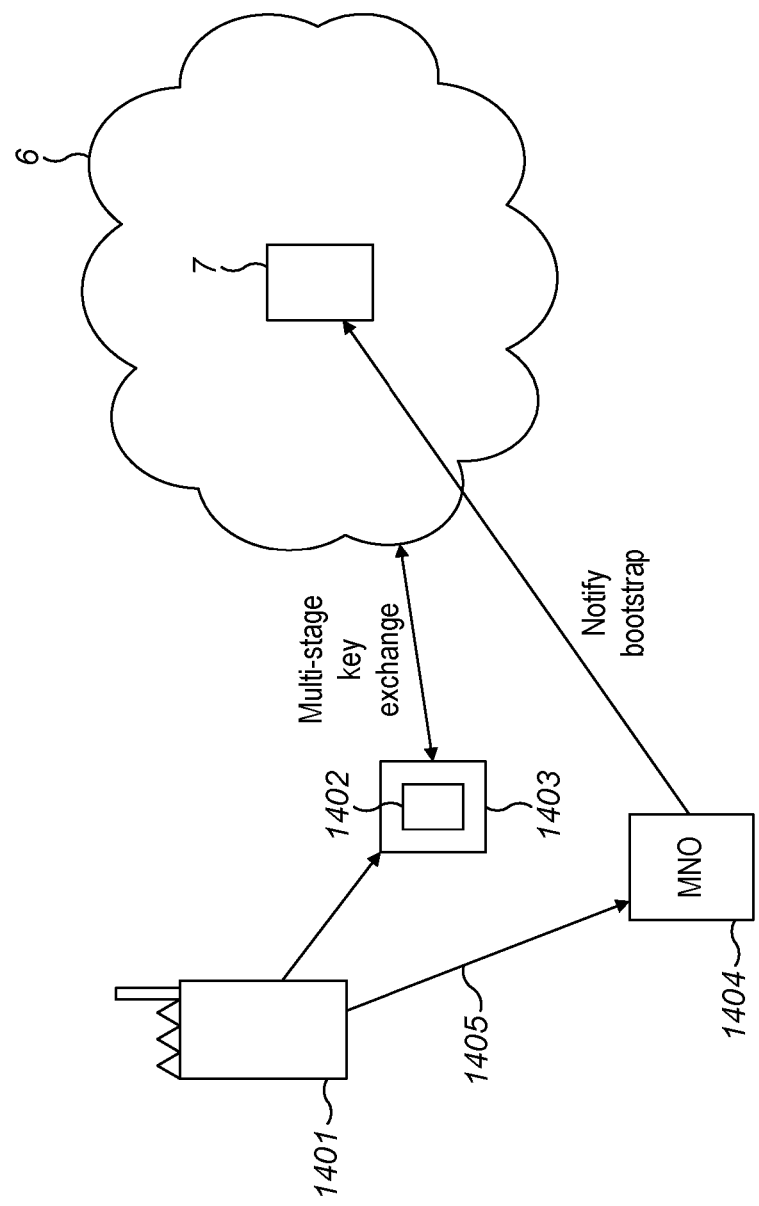
FIG. 14 is a schematic diagram illustrating a terrestrial quantum key provisioning system according to a third embodiment of the invention.

FIG. 14 is a schematic diagram illustrating an overview of an example of a trustless key provisioning system 1400 according to a third embodiment of the invention. The third embodiment of the invention is intended to keyfill a bootstrap symmetric key, which can act as a root of trust, onto a computing device containing a SIM card by using a secret present in the SIM card which is also known to the network operator or other party. Similarly to the first and second embodiments, the keyfill is through a process which can be made partially or wholly autonomous, in which the supporting cloud service, all human actors, and all eavesdroppers are unable to gain access to the symmetric key.

As shown in FIG. 14, a manufacturing facility 1401 produces SIMs 1402, which are subsequently incorporated into computing devices 1403. The computing devices 1403 may be smartphones, or other types of device with a communications capability. Each SIM 1402 comprises a number of inaccessible symmetric encryption keys which are embedded onto the SIM card 1402 during manufacture of the SIM 1402 by the manufacturing facility 1401. Typically, these inaccessible symmetric encryption keys are loaded into the SIM during a initialisation layer referred to as the "pre-personalisation" layer which is then locked down against access at higher levels of initialisation. The inaccessible symmetric encryption keys typically comprise an OTA key and an authentication key K, and may further comprise PIN and PUK keys.

The embedded symmetric encryption keys are used, among other things, by a mobile network operator (MNO) 1404 to authenticate the SIM for access to a wireless communication network operated by the MNO 1404. Accordingly, it will be understood that at least the embedded symmetric encryption keys used to authenticate the SIM must be available to both the manufacturing facility 1401 and the MNO 1404 at some time. Typically, when the manufacturing facility 1401 produces a batch of SIMs 1402 for an MNO 1404, the manufacturing facility 1401 (or a SIM vendor operating or connected with the manufacturing facility 1401) sends 1405 the pre-personalisation data including the encryption keys for the SIMs 1402 to the MNO 1404 in a secure manner, for example over a VPN. The manufacturing facility 1401 and/or the SIM vendor then deletes the pre-personalisation data from their records. It will be understood that the manufacturing facility 1401 and the MNO 1404 must have means for secure communication of the symmetric keys loaded onto the SIM 1402 in order to carry out the normal SIM provisioning process.

In the third embodiment, the MNO 1404 sends 1406 derived data which is derived from one of the keys on the SIM 1402 to a cloud service 6 over a secure channel, which corresponds to the cloud service 6 of the first and second embodiments. The MNO 1404 may be provided with a secure node providing quantum safe communication with the cloud service 6.

In some examples, the derived data may be a hash, or a hash diversified ratchet, of one of the inaccessible symmetric keys on the SIM 1402. In other examples, the derived data may be generated by signing a fixed or dynamic piece of data using one of the inaccessible symmetric secret keys on the SIM 1402, such as the OTA key or the authentication key, and optionally hashing the result. It will be understood that alternative and/or additional processes may be used to derive the derived data from the inaccessible symmetric key, and that the same function will also be applied on the target device to calculate the same derived data. In some examples, the derived data may be derived from the OTA key. In other examples, the derived data may be derived from the authentication key. It will be understood that any symmetric keys which are securely loaded onto the SIM 1402 at any point during manufacture of the SIM 1402 may be used as the basis for the derived data.

The cloud service 6 stores the received derived data in a database 7, which corresponds to the database 7 of the first and second embodiments.

Figure 15:
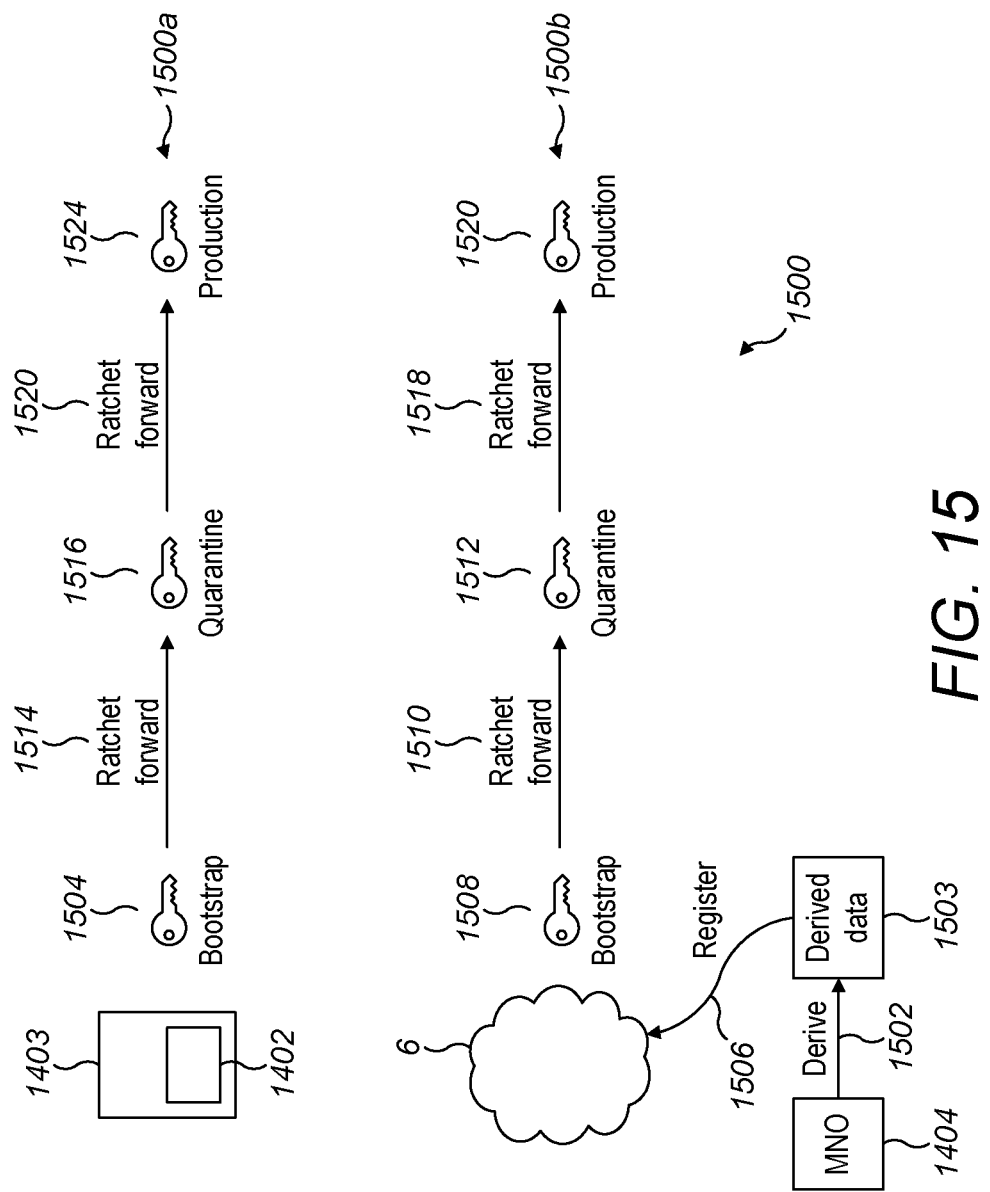
FIG. 15 is a schematic diagram illustrating a keyfill process according to the third embodiment of FIG. 14.

FIG. 15 shows an overview of the workflow of the overall key provisioning process 1500 carried out by the key provisioning system 1400 according to the third embodiment.

As shown in FIG. 15, for each SIM 1402, the key provisioning process 1500 begins with an inaccessible symmetric key already loaded on the SIM 1402, this inaccessible symmetric key having been loaded onto the SIM 1402 during manufacture by the manufacturing facility 1401. The MNO 14, which also has this inaccessible symmetric key available in its database, then carries out a defined derivation operation 1502 to derive the derived data 1504 from the inaccessible symmetric key. As discussed above, the derivation operation may comprise generating a hash of the inaccessible key, or using the inaccessible key to sign a piece of data, possibly followed by an optional hashing operation.

The MNO 1404, then provisions 1506 the derived data 1504 with the cloud service 6 over a secure channel, optionally using a secure node to carry out secure communication with the cloud service 6. To carry out the provisioning 1506, the MNO 1404, notifies the cloud service 6 of the derived data 1504 related to the SIM 1402, for example by using the secure node. The cloud service 6 stores the derived data provided by the MNO 1404 in the database 7.

The process 1500 operates similarly to the process 300 used by the first and second embodiments, with the derived data used as, or in place of, the bootstrap key of the process 300. The derived data used as the bootstrap key is derived from a key stored on the SIM 1402. Accordingly, the SIM 1402 is able to regenerate this bootstrap key on-demand when needed from the stored key, for example by repeating the hash of the stored key or repeating the signing of the same data, possibly with the optional hash, and provide the bootstrap key to the computing device 1403. Accordingly, the computing device 1403, supported by the SIM 1402, is able to carry out the authentication flow to generate the bootstrap key and subsequent keys ratcheted from the bootstrap key as necessary. Similarly, the cloud service 6 has the derived data stored in the database 7 as the bootstrap key, so that the cloud service 6 is also able to carry out the authentication flow using the bootstrap key and subsequent keys ratcheted from the bootstrap key as necessary.

The key provisioning process 1500 securely provides the derived data to the cloud service 6. As is explained above, the derived data is already available to the computing device 1403 from the SIM 1402. Accordingly, the computing device 1403 and the cloud service 6 can then use the derived data (or data derived from the derived data) as a pair of symmetric keys, and ratchet these two keys (that is, the two copies of the same symmetric key/derived data) forward in identical steps, each comprising a ratchet operation, in both the cloud service 6 and device 1403 environments, to arrive at identical keys at the cloud service 6 and the device 1403. At each step a start key is converted by the ratchet operation into different new, or generated, key. These final identical keys can then be used as symmetric keys acting as a root of trust, which can be used to carry out quantum computing secure communication between the cloud service 6 and the device 1403, or for any other desired task. Accordingly, the key provisioning process 1500 has two branches, or arms, which are carried out in parallel, comprising a first branch 1500a, the upper branch in FIG. 15, carried out at the device 1403, and a second branch 1500b, the lower branch in FIG. 15, carried out at the cloud service 6.

In the illustrated example of the third embodiment, the derived data is derived from a symmetric encryption key. In other examples, in general the derived data may be derived from any form of shared secret data which can be used as a shared encryption key, or can be used as a basis for a shared encryption key.

In each branch 1500a, 1500b of the key provisioning process 1500, the key can be used as an authentication key for the device 1403 to authenticate to the cloud service 6, and then generate the next key in the chain. The final key can continue to be used for authentication, for example to allow generation of session keys, or for any other purpose.

The workflow is defined by policy, so different workflows can be defined for different situations by assigning different policies to devices or groups of devices, in a similar manner to that described in detail in relation to the first and second embodiments above.

The key provisioning process 1500 according to the third embodiment has a number of goals, as follows. To use policy to define a sequence of workflow steps which define a key chain used for authentication of devices 1403 to the cloud service 6 for future key negotiation tasks (e.g. to negotiate session keys with another device), or could be used for any other purpose. To associate a device 1403 with a workflow step policy, where each workflow step defines whether the step requires user authentication and/or commissioning officer approval. To provision a bootstrap key onto the device 1403, wherein the bootstrap key is derived data calculated from a symmetric key stored on the SIM 1402 of the device 1403, and the boostrap key/derived data is securely sent to the cloud service 6 by the manufacturing facility 1401 or the MNO 1404 by a classically secured, post-quantum cryptographically secured, or physical mechanism, this ensures that the bootstrap key cannot be intercepted in transit over classical communication channels between the device 1403 and the cloud service 6. To enable the device 1403 to connect to the cloud service 6 using the bootstrap key, and transition to a new authentication key using a ratchet mechanism according to the policy defined. Subsequently, to enable the device 1403 to connect to the cloud service 6 using the latest ratchet key, and transition to a new authentication key using a ratchet mechanism according to the policy defined.

An overview of the key provisioning process 1500 of FIG. 15 according to the third embodiment is set out below. All operations of the key provisioning process 1500 and/or carried out by the system 1400 will be securely logged and/or audited using a verifiable quantum secure hash-chain in a similar manner to the embodiments described above.

In advance of carrying out the key provisioning process 1500, users of the system 1400 are signed up, or registered, with the cloud service 6 and assigned roles, in a similar manner to the embodiments described above.

Referring to FIG. 15, the system 1400 provides an acyclic state-machine in which a responsible administrator can specify a series of workflow steps which define a key ratchet pipeline forming the branches 1500a, 1500b of the key provisioning process 1500. Similarly to the embodiments described above, before the key provisioning process 1500 of FIG. 15 can be carried out for a device 1403, the responsible administrator(s) must define a workflow step policy defining one or more workflow steps, and therefore defining a chain of steps in the workflow of the key provisioning process 1500, and this defined workflow step policy is stored in the database 7 in the cloud service 6. Further, the individual workflow steps must also be defined, and these defined workflow steps are also stored in the database 7 in the cloud service 6.

For simplicity and clarity the present description relates to the keyfilling of a single device 1403 according to a single workflow policy. It will be understood that different organisations using the system 1400 may set different workflow policies, and that each organisation may have multiple different workflow policies for different devices 1403 or groups of devices 1403.

As shown in FIG. 15, for each device 1403, the key provisioning process 1500 begins by the MNO 1404 deriving 1502 derived data 1503 to be used as a bootstrap key for the device 1403 from a symmetric key stored in the SIM 1402 of the device 1403, and known to the MNO 1404, and provisioning 1506 this derived data/bootstrap key 1503 with the cloud service 6. Further, as part of the provisioning 1506, the MNO 1404 notifies the cloud service 6 of metadata related to the device 1403 and/or SIM 1402, for example the device ID and/or manufacturer and/or a SIM ID. As is discussed above, as an alternative to being derived from a symmetric encryption key, the derived data used as the bootstrap key may be derived from any form of shared secret data which can be used as a shared encryption key, or can be used as a basis for a shared encryption key. The key provisioning process 1500 may start at any time during the lifetime of the device 1403 and SIM 1402, there is no requirement that this is carried out during, or close to, manufacture of the SIM 1402.

The cloud service 6 stores the derived data/bootstrap key provided by the MNO 1404 in an HSM of the cloud service 6. Since the derived data/bootstrap key is derived from a symmetric key stored on the SIM 1402, the SIM 1402 is able to derive the bootstrap key and provide the bootstrap key to the device 1403 on-demand when the bootstrap key is required by the device 1403.

Similarly to the embodiments described above, as a part of the provisioning 1506, the cloud service 6 generates a device record for the device 1403 in the database 7, which device record stores or links to a copy of the workflow policy selected for the device 1403 by the relevant administrator(s) and/or the MNO 1404 and/or the manufacturing facility 1401. Further, the cloud service 6 initialises a commissioning signatures field and a commissioning parties field for the device 1403 to zero, and generates and stores a random commissioning salt, for use in each workflow step for that device 1403 that requires commissioning officer approval.

The cloud service 6 initialises the device record in the database 7 for the device 1403 with a workflow state bootstrap 1508. Further, when the device 1403 first attempts to authenticate with the cloud service 6, the device 1403 will start at the known state bootstrap 1504 using the derived data/bootstrap key derived by the SIM 1402 from the symmetric key stored on the SIM 1402.

Accordingly, the workflow state of the device 1503 will start at the known state bootstrap 1504 and the workflow state of the device record for the device 1503 in the cloud service 6 will be the corresponding known state bootstrap 1508. The device 1503 can transition to the next workflow state if the requirements of the next workflow state are met, as defined in the workflow step policy assigned to the device 1503. The bootstrap key grants access to a limited set of cloud service APIs.

The system 1400 provides a method for the device 1403 to authenticate to the cloud service 6 using either the bootstrap key or a key ratcheted from the bootstrap key. In each case, the cloud service 6 builds the keychain required for authentication from the initial derived data, which may be stored in an HSM, to generate the bootstrap key. Subsequent keys based on the bootstrap key can be calculated by the cloud service 6 by using the stored ratchet values held in the database 7. When the device 1403 has been authenticated to the cloud service 6 using either the bootstrap key or a key subsequently ratcheted from it, the cloud service 6 returns a token, such as a JSON Web Token (JWT), whose scope is defined by the workflow step, to the device 1403. The authentication of the device 1403 by the cloud service 6 uses a challenge response to generate a session key from the current key (the bootstrap key or a key subsequently ratcheted from the bootstrap key) and a set of two challenge codes which are exchanged between the device 1403 and the cloud service 6, and then discarded.

The cloud service 6 uses a key to encrypt client state, K_CS of the device 1403 to allow RESTful APIs, similarly to the embodiments described above.

When a workflow step requires commissioning officer approval in order for the target device 8 to transition, a similar process is used to that described for the embodiments described above.

Following authentication of the device 1403 to the cloud service 6 using either the bootstrap key or a key ratcheted from the bootstrap key, as appropriate, and the device 1403 receiving an authentication token, such as a JWT from the cloud service 6, and negotiating a session key with the cloud service 6, the user of the device 1403 can initiate a provisioning process for the device 1403 with the cloud service 6.

In order to register the device 1403 with the cloud service 6, the device 1403 calls a provisioning function, passing the authentication token and (optionally) the user credentials if required by the workflow step. Optionally, the cloud service 6 may authenticate the user using a password, and optionally using two factor authentication (2FA). In response to receipt of the token, and if any optional user authentication is successful, the cloud service 6 generates some random data and uses this to create a ratchet value that is be used to ratchet the current latest ratchet key into the next ratchet key, storing this value in the database 7 in an array of ratchet values associated with the device 1403. Optionally, if the current workflow step for the device 1403 requires commissioning officer approval and the required approvals are stored in the commissioning signatures field associated with the workflow step, then the list of commissioning signatures are combined into the ratchet value for the workflow step. This ratchet value will be used as the latest in a chain of ratchet values which can be used to calculate a new authentication key from the stored derived data on-demand in future.

The cloud service 6 then returns the ratchet value to the device 1403, enabling the target device 1403 to also create the new ratchet key from the latest key in its chain to form a new authentication key. Accordingly, the new ratchet key will be created from the derived data/bootstrap key at first enrolment, or from the key created by the previous enrolment in later enrolments.

As shown in FIG. 15, when the device 1403 is in the bootstrap state 1504, the key provisioning process 1500 continues by the user of the device 1403 authenticating and registering the device 1403 with the cloud service 6 using the authenticaton and provisioning processes described above. If the authentication and provisioning processes are successful, and any commissioning officer approvals identified as required by the next workflow step of the workflow step policy which applies to the device 1403 are received, the cloud service 6 generates a ratchet value as described above, and uses the ratchet value to create a ratchet authentication key from the bootstrap key. The cloud service 6 then ratchets 1510 forward the status of the device 1403 in the device record in the database 7 from the bootstrap state 1508 to the next workflow state, in the example of FIG. 15 the intermediate state 1512 named "quarantine".

The cloud service 6, then, or simultaneously, sends the ratchet value to the device 1403, and the device 1403 creates the same ratchet authentication key from the bootstrap key, which was in turn previously created from the symmetric key as described above, and the target device 8 ratchets 1514 its status forward from the bootstrap state 1504 to the next workflow state, in the example of FIG. 3 the intermediate state 1516, named "quarantine".

In the example of FIG. 15, the device 1403 in the intermediate "quarantine" state 1516 and having the status of the device 1403 in the device record in the database 7 also in the intermediate "quarantine" state 1510, is provided with restricted systems and network connectivity by the cloud service 6, subject to the device 1403 being successfully authenticated and registered with the cloud service 6. This restricted connectivity is selected to ensure that a device 1403 in the intermediate "quarantine" state 1514 cannot be used to harm, or breach the security of, the cloud service 6. In some examples the restricted connectivity provided to a device 1403 in the intermediate "quarantine" state 1516 may be to allow connectivity only to a closed quarantine network.

Then, when the device 1403 is in the intermediate "quarantine" state 1516, the key provisioning process 1500 continues by the user of the device 1403 again authenticating and registering the device 1403 with the cloud service 6 using the authenticaton and provisioning processes described above. If the authentication and provisioning processes are successful, and any commissioning officer approvals identified as required by the next workflow step of the workflow step policy which applies to the device 1403 are received, the cloud service 6 generates a further ratchet value as described above, and uses the further ratchet value to create a new ratchet authentication key from the ratchet key. which is in turn created from the bootstrap key and the selected QKD key as described above. The cloud service 6 then ratchets 1518 forward the status of the device 1403 in the device record in the database 7 from the intermediate "quarantine" state 1512 to the next workflow state, in the example of FIG. 15 the final state 1520, named "production".

The cloud service 6, then, or simultaneously, sends the further ratchet value to the device 1403, and the device 1403 creates the same new ratchet authentication key from the ratchet key, which was in turn previously created from the bootstrap key and the symmetrical key as described above, and the device 1403 ratchets 1522 its status forward from the intermediate "quarantine" state 1516 to the next workflow state, in the example of FIG. 15 the final "production" state 1524.

In the example of FIG. 15, the device 1403 in the final "production" state 1524 and having the status of the device 1403 in the device record in the database 7 also in the final "production" state 1520, is provided with full systems and network connectivity by the cloud service 6, subject to the device 1403 being successfully authenticated and registered with the cloud service 6. The connectivity provided may be set by connectivity policies of the MNO 1404 an organisation controlling the device 1403. The final "production" key will permit access to a wider range of cloud service functions than the "quarantine" state, with the access provided being defined by the scopes in the relevant workflow policy.

The example of FIG. 15 shows a key provisioning process 1500 in which a device 1403 is ratcheted from an initial bootstrap state 1504 to an intermediate quarantine state 1516 to a final production state 1524 providing full systems and network connectivity. In other examples there may be any number of intermediate states between an initial bootstrap state and a final production state, as required by the policies of any particular organisation. These intermediate states made include the same examples as are set out for the example of FIG. 3. The requirements to allow a device 1403 to ratchet forwards from one state to the next may be set as desired, and in particular whether user authentication and whether commissioning officer approvals are required, and their number, may be set as required. It is not essential to provide an intermediate quarantine state providing restricted connectivity.

In some circumstances it may be necessary to revoke all keys associated with a device 1403 and to return the device 1403 back to the original manufacturing facility state. This may be done by zeroing all commissioning parties and commissioning signatures fields, zeroing all ratchet fields, and setting the current workflow step back to the start. This will reset both the device 1403 and the record for the device 1403 in the database 7 back to the bootstrap states 1504 and 1508 respectively. The device 1403 can then restart the enrolment process again, as desired.

According to the third embodiment, APP providers may be provided with an SDK to enable the APP provider to form secure sessions and call apis on the cloud service without compromising the SIM or the symmetric keys on the SIM.

Although the derived data is provided to the cloud service by the MNO, so that the bootstrap key is potentially vulnerable because it is known to the MNO, it will be understood from the above that the subsequent keys generated from the bootstrap key by the ratcheting process will be unknown to the MNO.

It will be understood from the above, that the disclosed third embodiment can achieve the goals set out above.

The third embodiment may be carried out according to the more detailed examples set out above in relation to the first and second embodiments, and described with reference to FIGS. 4 to 13.

In the illustrated example of the third embodiment described above, the MNO carries out the provisioning of the derived data to the cloud service. In other examples the derived data may be registered to the cloud service by other entities involved in providing the SIM, such as the manufacturing facility or a SIM vendor. If the provisioning is carried out by the manufacturing facility, it will be necessary to carry out the provisioning before the accessible symmetric keys are deleted from the manufacturing facility records.

In the illustrated example of the third embodiment described above, the derived data provided to the cloud service 6 is used as the bootstrap key. In other examples, the derived data may be subject to further processing to generate the bootstrap key, provided that both the cloud service 6 and the device 1403 with SIM 1402 are able to carry out the same further processing.

In the illustrated example of the third embodiment described above, the SIM may, for example, be a physical SIM card or an eSIM.

The example of the third embodiment described above uses a SIM having a symmetric key. In other examples, any user device having a pre-existing shared secret installed on the device may be used, with the installed shared secret being used as a basis for the derived data. In some examples the pre-existing shared secret may be a symmetric encryption key. Examples of such devices are Trusted Platform Modules (TPM).

The third embodiment may be used at any time, including after the device has left the manufacturer and is in the hands of an end user. In examples where the device is a mobile phone, or other device equipped with a SIM for mobile communications, the third embodiment may be used at any time during the lifetime of the mobile phone, even years after it is deployed, because an app on the mobile phone will be able to derive the bootstrap key, and the bootstrap key may be stored by the cloud service, or the MNO will be able to provide the bootstrap key to the cloud service.

As can be understood from the above, the disclosed embodiments enable a device to be keyfilled with a symmetric encryption key. The commissioning officers do not have any access to, or knowledge of, the final production encryption key deployed to the device. Further, subject to the storage protection used to store the keys on the device, the user of the device does not have any knowledge of the bootstrap key or the final production encryption key deployed to the device. Accordingly, the security of the production encryption key deployed to the device is assured, and the device can be loaded with the production encryption key in a "trustless" manner, where it is not necessary to trust any of the parties to hold the production encryption key deployed to the device, other than the cloud service, which must of course have a shared copy of the symmetric production encryption key in order to authenticate and provide services to the device. The device can be keyfilled without any need for security personnel to physically travel to a device location to manually keyfill a device.

In some examples the user may be provided with an "under duress" code which can be input by the user when attempting to log onto the cloud service using their device. The cloud service will respond to the under duress code by revoking the production encryption key of the device to prevent improper use. In some examples the cloud service may remote wipe the device in response to the under duress code. In some examples the device may be loaded with spoof, or dummy, data in response to the under duress code in order to conceal the use of the under duress code from third parties.

The production encryption key enables access to the cloud service by the device. Web usage by the device can be limited to authorized destinations selected by the organization responsible for the device by the setting of permissions within the cloud service. Web usage and other resource access by the device may be fully regulated, logged, and validated by services provided within the cloud service.

The use of the various encryption keys to enable the different stages of the key distribution process allows the key provisioning process to be centrally managed and controlled in a secure manner, and limits any potential network exposure for the devices, applications, and users, involved in the process.

The methods of the present application enable the key provisioning and commissioning process to be transaction secured, verified and fully auditable using the cloud service.

Although the example above relates to delivery of a single encryption key to a single target device, for simplicity and clarity, the method may be used to deliver any desired number of encryption keys to any desired number of target devices in an automated trustless key fill process.

The methods of the present application can be used to deliver high volumes of keys, such as automated keys and device bootstrap keys, on a B2B or B2C model, for example to Network telco-based service providers, device manufacturers, governments, large corporate entities, and individual organisations/user groups.

As can be understood from the above, the methods of the present application provide a global solution for quantum-secure key provisioning and symmetric key management. This can support global distribution of data and information on secure private channels, global distribution and management of actors, and global authentication of devices, users, systems, and access.

In the illustrated embodiments an encryption key is deployed to an target device. The target device may be any type of device, such as an end point device (EPD). It is not essential that the target device to which the encryption key is deployed is a discrete device, the "target device" may be a system, or any type of end point.

In some examples, when the device is in the quarantine state, any necessary updates of the device may be carried out, such as updates to software, profiles, maintenance, and system access, although the device is not granted full connectivity by the cloud service. This list is not intended to be exhaustive.

In the embodiments described above the system according to the first embodiment comprises at least one satellite 1. In some examples the system may comprise a constellation of satellites include satellites having different capabilities, for example different optical communications capabilities and/or a capability to support different quantum key provisioning methodologies.

In the embodiment described above the system comprises two optical ground receivers (OGRs) 2. The system may comprise any number of OGRs 2. This may be a large number of OGRs 2, for example 10,000 or more.

In the embodiments described above the HSMs 4 may be physical or virtual.

In the embodiments described above the HSMs 4 are comprised in the OGRs 2. In other examples some, or all, HSMs 4 may instead be securely connected to an OGR 2. In some examples, come HSMs 4 may be controlled by users of the system.

The embodiments described above comprise a manufacturing facility 5. In other examples this may instead be any type of facility able to inject a bootstrap key into a device, and to communicate in a secure manner with the cloud service.

In the embodiments described above the manufacturing facility communicates with the cloud service using a bootstrap terminal. This is not essential, and other means could be used.

In the embodiments described above the system is a quantum key provisioning system. In other examples other cryptographic items could be provisioned, distributed or delivered in addition to, or as an alternative to, encryption keys. Examples of such other cryptographic items include cryptographic tokens, cryptographic coins, or value transfers.

The embodiments described above are fully automatic. In some examples a user or operator of the system may manually instruct some steps of the method to be carried out.

In the described embodiments of the invention parts of the system may be implemented as a form of a computing and/or electronic device. Such a device may comprise one or more processors which may be microprocessors, controllers or any other suitable type of processors for processing computer executable instructions to control the operation of the device in order to gather and record routing information. In some examples, for example where a system on a chip architecture is used, the processors may include one or more fixed function blocks (also referred to as accelerators) which implement a part of the method in hardware (rather than software or firmware). Platform software comprising an operating system or any other suitable platform software may be provided at the computing-based device to enable application software to be executed on the device.

Various functions described herein can be implemented in hardware, software, or any combination thereof. If implemented in software, the functions can be stored on or transmitted over as one or more instructions or code on a computer-readable medium. Computer-readable media may include, for example, computer-readable storage media. Computer-readable storage media may include volatile or non-volatile, removable or non-removable media implemented in any method or technology for storage of information such as computer readable instructions, data structures, program modules or other data. A computer-readable storage media can be any available storage media that may be accessed by a computer. By way of example, and not limitation, such computer-readable storage media may comprise RAM, ROM, EEPROM, flash memory or other memory devices, CD-ROM or other optical disc storage, magnetic disc storage or other magnetic storage devices, or any other medium that can be used to carry or store desired program code in the form of instructions or data structures and that can be accessed by a computer. Disc and disk, as used herein, include compact disc (CD), laser disc, optical disc, digital versatile disc (DVD), floppy disk, and blu-ray disc (BD). Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, DSL, or wireless technologies such as infrared, radio, and microwave are included in the definition of communication medium. Combinations of the above should also be included within the scope of computer-readable media.

Alternatively, or in addition, the functionality described herein can be performed, at least in part, by one or more hardware logic components. For example, and without limitation, hardware logic components that can be used may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Although illustrated as single systems, it is to be understood that the systems of the first and second embodiments may be distributed systems.

It will be understood that the benefits and advantages described above may relate to one embodiment or may relate to several embodiments. The embodiments are not limited to those that solve any or all of the stated problems or those that have any or all of the stated benefits and advantages. Variants should be considered to be included into the scope of the invention.

Any reference to 'an' item refers to one or more of those items. The term 'comprising' is used herein to mean including the method steps or elements identified, but that such steps or elements do not comprise an exclusive list and a method or apparatus may contain additional steps or elements.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something".

Further, to the extent that the term "includes" is used in either the detailed description or the claims, such term is intended to be inclusive in a manner similar to the term "comprising" as "comprising" is interpreted when employed as a transitional word in a claim.

The figures illustrate exemplary methods. While the methods are shown and described as being a series of acts that are performed in a particular sequence, it is to be understood and appreciated that the methods are not limited by the order of the sequence. For example, some acts can occur in a different order than what is described herein. In addition, an act can occur concurrently with another act. Further, in some instances, not all acts may be required to implement a method described herein.

Moreover, the acts described herein may comprise computer-executable instructions that can be implemented by one or more processors and/or stored on a computer-readable medium or media. The computer-executable instructions can include routines, sub-routines, programs, threads of execution, and/or the like. Still further, results of acts of the methods can be stored in a computer-readable medium, displayed on a display device, and/or the like.

The order of the steps of the methods described herein is exemplary, but the steps may be carried out in any suitable order, or simultaneously where appropriate. Additionally, steps may be added or substituted in, or individual steps may be deleted from any of the methods without departing from the scope of the subject matter described herein. Aspects of any of the examples described above may be combined with aspects of any of the other examples described to form further examples without losing the effect sought.

It will be understood that the above description of preferred embodiments is given by way of example only and that various modifications may be made by those skilled in the art. What has been described above includes examples of one or more embodiments. It is, of course, not possible to describe every conceivable modification and alteration of the above devices or methods for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims.

The invention claimed is:

1. A method of encryption key provisioning comprising:
providing, by a quantum computing safe method, a shared secret data to a device and also to a security service;
using the provided shared secret data to provide a root key; and
using the root key as a basis for a sequence of stages, wherein each stage comprises an operation which converts a start key into a different generated key, and the same stages are carried out in parallel at the device and at the security service;
wherein the root key is used as the start key for a first stage of the sequence, and a generated key produced by each stage of the sequence, except for a final stage of the sequence, is used as a start key for a next stage of the sequence; and
wherein the generated keys produced by the final stage of the sequence at the device and at the security service are symmetric keys.

2. The method according to claim 1, further comprising using the generated keys produced by the final stage of the sequence at the device and at the security service to authenticate the device to the security service.

3. The method according to claim 1, wherein the shared secret data is a symmetric encryption key or data derived from a symmetric encryption key.

4. The method according to claim 1, wherein the start keys for each stage of the sequence of stages at the device and at the security service are used as a symmetric key to authenticate the device to the security service and enable secure communication between the device and the security service.

5. The method according to claim 4, wherein, after the device has been authenticated to the security service, the security service sends data to the device, and further comprising using this data to convert a start key into a different generated key for a current stage of the sequence of stages.

6. The method according to claim 1, wherein each stage comprises a ratchet operation.

7. The method according to claim 1, wherein there are a plurality of stages in the sequence of stages and the sequence of stages generate a corresponding sequence of keys, and different keys of the sequence of keys are associated with different scopes or permissions when used as symmetric keys to authenticate the device to the security service.

8. The method according to claim 1, wherein the security service is a cloud service.

9. A method of encryption key provisioning comprising:
providing, by a quantum computing safe method, data derived from a secret data on a device to a security service; and
using the provided data derived from the secret data to provide a root key;
using the root key as a basis for a sequence of stages, wherein each stage comprises an operation which converts a start key into a different generated key, and the same stages are carried out in parallel at the device and at the security service;
wherein the root key is used as the start key for a first stage of the sequence, and a generated key produced by each stage of the sequence, except for a final stage of the sequence, is used as a start key for a next stage of the sequence; and
wherein the generated keys produced by the final stage of the sequence at the device and at the security service are symmetric keys.

10. The method according to claim 9, and further comprising using the generated keys produced by the final stage of the sequence at the device and at the security service to authenticate the device to the security service.

11. The method according to claim 9, wherein the secret data is a symmetric encryption key or data derived from a symmetric encryption key.

12. The method according to claim 9, wherein the start keys for each stage of the sequence of stages at the device and at the security service are used as a symmetric key to authenticate the device to the security service and enable secure communication between the device and the security service.

13. The method according to claim 12, wherein, after the device has been authenticated to the security service, the security service sends data to the device, and further comprising using this data to convert a start key into a different generated key for a current stage of the sequence of stages.

14. The method according to claim 9, wherein each stage comprises a ratchet operation.

15. The method according to claim 9, wherein there are a plurality of stages in the sequence of stages and the sequence of stages generate a corresponding sequence of keys, and different keys of the sequence of keys are associated with different scopes or permissions when used as symmetric keys to authenticate the device to the security service.

16. The method according to claim 9, wherein the security service is a cloud service.

* * * * *